US011932354B2

(12) United States Patent
Johansen et al.

(10) Patent No.: US 11,932,354 B2
(45) Date of Patent: Mar. 19, 2024

(54) FLUID CARGO HANDLING SYSTEM WITH QUICK RELEASE

(71) Applicant: Stena Power & LNG Solutions AS, Grimstad (NO)

(72) Inventors: Knut-Erik Johansen, Horten (NO); Svein Borge Hellesmark, Fevik (NO)

(73) Assignee: Stena Power & LNG Solutions AS, Grimstad (NO)

( * ) Notice: Subject to any disclaimer, the term of this patent is extended or adjusted under 35 U.S.C. 154(b) by 0 days.

(21) Appl. No.: 18/309,952

(22) Filed: May 1, 2023

(65) Prior Publication Data

US 2023/0348027 A1 Nov. 2, 2023

Related U.S. Application Data

(60) Provisional application No. 63/363,983, filed on May 2, 2022.

(51) Int. Cl.
*B63B 27/34* (2006.01)
*B63B 25/14* (2006.01)
(Continued)

(52) U.S. Cl.
CPC .............. *B63B 27/34* (2013.01); *B63B 25/14* (2013.01); *B63B 27/10* (2013.01); *B63B 27/24* (2013.01);
(Continued)

(58) Field of Classification Search
CPC ......... B63B 27/00; B63B 27/24; B63B 27/34; B63B 25/00; B63B 25/14; B63B 27/10; B63B 35/44; B63B 35/4406; F17C 5/00; F17C 5/02; F17C 2205/0388; F17C 2221/014; F17C 2223/0161; F17C 2223/033; F17C 2270/0105
(Continued)

(56) References Cited

U.S. PATENT DOCUMENTS

| | | | |
|---|---|---|---|
| 11,541,973 | B1 | 1/2023 | Hellesmark |
| 2017/0253302 | A1 | 9/2017 | Hellesmark et al. |
| 2019/0161146 | A1 | 5/2019 | Hellesmark |

FOREIGN PATENT DOCUMENTS

| | | | | |
|---|---|---|---|---|
| JP | H0616180 A | | 1/1994 | |
| WO | WO-2005043032 A1 | * | 5/2005 | ................ F17C 7/04 |
| WO | WO-2013068561 A1 | * | 5/2013 | ............. B63B 27/24 |

OTHER PUBLICATIONS

Invitation to Pay Additional Fees and Partial Search Report issued for International Patent Application No. PCT/NO2023/050102, dated Sep. 18, 2023, 5 pages, ISA/EP.

* cited by examiner

*Primary Examiner* — Lars A Olson
(74) *Attorney, Agent, or Firm* — Haynes and Boone, LLP

(57) ABSTRACT

A fluid cargo handling system includes a quick release manifold system mounted on a floating marine platform. The quick release manifold system has a first valve in fluid communication with the first end of a first fluid transfer hose to control fluid flow within the first fluid transfer hose. A first coupler is attached to the first valve. The first coupler has a first port in fluid communication with the first valve, a second port, a purging fluid inlet and a waste fluid outlet. A drain tank is in fluid communication with the first coupler via the waste fluid outlet, and a pressurized fluid source carried is in fluid communication with the first coupler via the purging fluid inlet.

27 Claims, 16 Drawing Sheets

(51) Int. Cl.
*B63B 27/10* (2006.01)
*B63B 27/24* (2006.01)
*B63B 35/44* (2006.01)
*F17C 5/02* (2006.01)

(52) U.S. Cl.
CPC ............ *B63B 35/4406* (2013.01); *F17C 5/02* (2013.01); *B63B 2035/4486* (2013.01); *F17C 2205/0388* (2013.01); *F17C 2221/014* (2013.01); *F17C 2223/0161* (2013.01); *F17C 2223/033* (2013.01); *F17C 2270/0105* (2013.01)

(58) Field of Classification Search
USPC ............................................................ 114/73
See application file for complete search history.

FLUID CARGO HANDLING SYSTEM WITH QUICK RELEASE

PRIORITY

This application claims the benefit of priority to U.S. Provisional Application No. 63/363,983, filed May 2, 2022, the benefit of which is claimed and the disclosure of which is incorporated by reference in its entirety.

TECHNICAL FIELD

The present disclosure generally relates to offshore transfer of fluid cargo, and more particularly to transfer of liquified gas from a marine vessel to an offshore location utilizing a floating marine platform positioned adjacent the marine vessel.

BACKGROUND

In the maritime industry, it may be necessary to deliver liquid cargo between ships or between a ship and an offshore platform or terminal. In such instances at least one ship is spread moored to secure the ship during the fluid transfer. Because of this spread mooring, it is difficult to moor the ship adjacent another ship or platform or terminal. Recent advances in the industry have resulted in a floating connection unit carrying tubing for the transfer of liquid cargo. The floating connection unit can be propelled to a position adjacent a spread moored liquid cargo ship where the floating connection unit can be moored directly to the liquid cargo ship, after which, tubing can be connected to manifolds of the liquid cargo ship to initiate flow of liquid cargo. Various mechanisms are provided for propulsion of the floating connection unit towards and away from the liquid cargo ship. One such propulsion mechanism is a chain-crawling drive wherein spooling winches onboard the floating connecting unit are used to pull the floating connection unit along chains disposed on the seabed. The spooling winches are arranged on the deck of the floating connection unit and the chains pass from the seabed upward through elongated vertical columns extending down from the center of the floating connection unit's hull bottom to keep the chains tracking close to the seabed. When moored to the liquid cargo vessel, fenders are provided along the side of the floating connection unit to bear against the side of the liquid cargo ship, allowing the floating connection unit to be secured to the liquid cargo ship during fluid transfer.

One drawback of the described floating connection unit of the prior art is that via the bumpers, the prior art floating connection unit is in physical contact with the liquid cargo ship to which it is moored, such that turbulence from currents, waves, wind and other weather conditions can cause the floating connection unit and the liquid cargo ship to rub against one another, potentially causing damage to both the liquid cargo ship and the floating connection unit.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
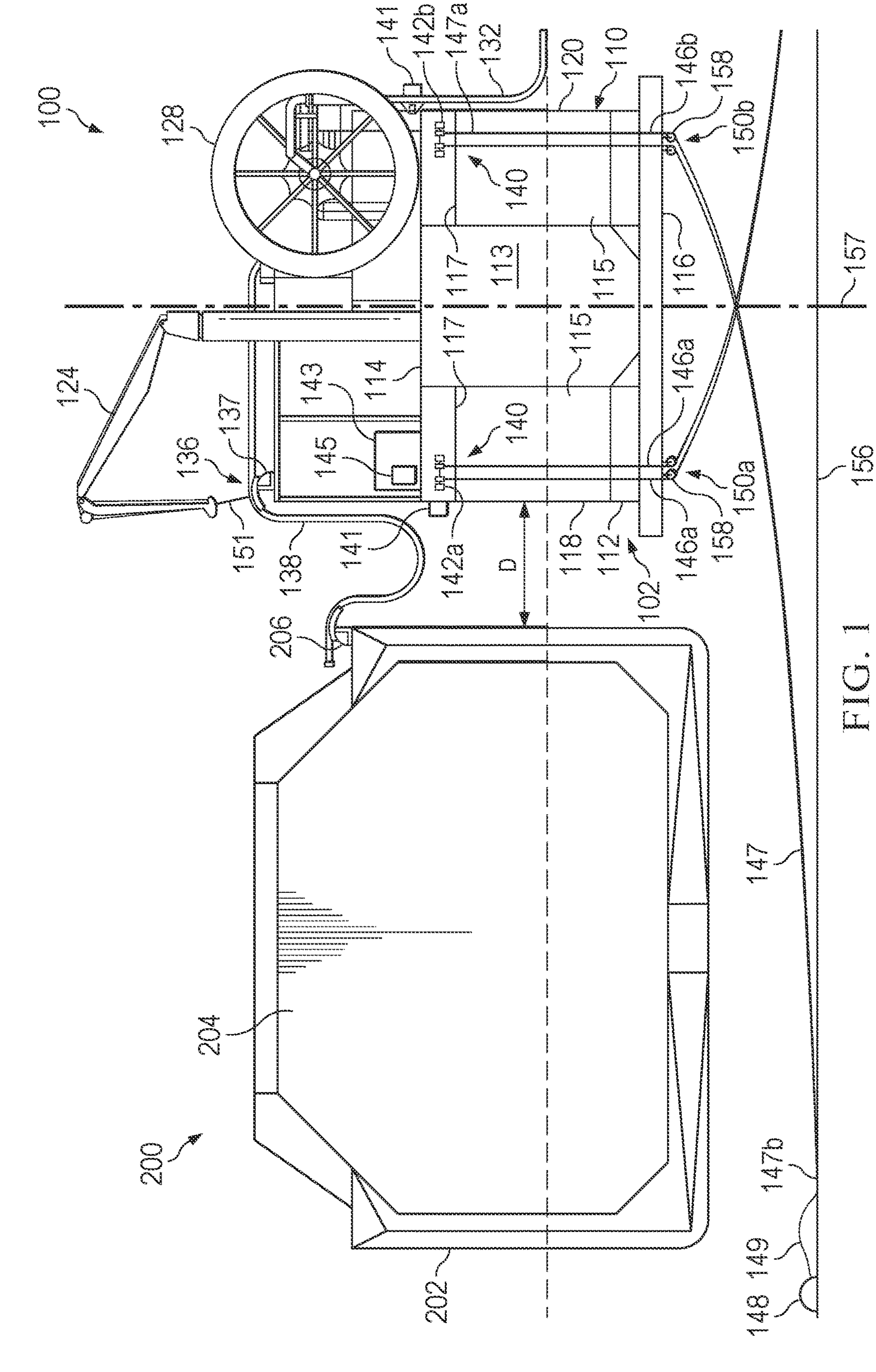
FIG. 1 is a partial cut-away side elevation view of a fluid cargo handling system of the disclosure.

Disclosed herein are systems and methods for offshore transfer of fluid cargo between a liquid cargo ship and another ship, marine platform or marine terminal. In one or more embodiments, the fluid cargo handling system is a floating marine platform having a buoyant hull with an upper deck and a hull bottom with at least one fluid cargo transfer hose carried on a hose reel mounted on the platform to allow fluidic connection between the floating marine platform and an adjacent ship, marine platform or marine terminal. The floating marine platform also includes a drive system that maintains the floating marine platform at an offset distance from another ship, marine platform or marine terminal while the floating marine platform is fluidically connected so that no physical contact is made directly or indirectly between floating marine platform and adjacent ship, marine platform or marine terminal. The drive system has at least two drive devices carried by the marine platform adjacent a first side of the platform and at least two drive devices carried by the marine platform adjacent a second side of the platform, with each of the drive devices along the first side engaging a separate driveline extending from adjacent the hull bottom towards the second side of the platform and each of the drive devices along the second side engaging a separate driveline extending from adjacent the hull bottom towards the first side of the platform. The floating marine platform may include a second deck spaced apart from the upper deck and positioned between the upper deck and the hull bottom, with the first and second drive devices positioned on the second deck so as to be spaced apart from the upper deck. The floating marine platform may include two first drive devices carried by the marine platform adjacent the first side and spaced apart from one another along the first side, and two second drive devices carried by the marine platform along the second side and spaced apart from one another.

In other embodiments, the fluid cargo handling system is a marine platform with a first fluid transfer hose carried on the marine platform, the first fluid transfer hose having a first end and a second end. A manifold system is in fluid communication with the first end of the first fluid transfer hose where the manifold system includes a first valve in fluid communication with first end of the first fluid transfer hose to control fluid flow within the first fluid transfer hose. A first coupler is attached the first valve with a drain tank in fluid communication with the first coupler. Finally, a pressurized fluid source is in fluid communication with the first coupler such that the pressurized fluid source may be activated to drive fluid cargo from the first coupler into the drain tank to ensure that no liquid cargo remains in first coupler during decoupling.

In other embodiments, the fluid cargo handling system includes a marine manifold tower system and a floating marine platform. At least two hose reels are carried by the floating marine platform with a cryogenic hose carried on each hose reel. A first end of each cryogenic hose is in fluid communication with a manifold system carried by the floating marine platform, and a second end of each cryogenic hose is coupled via cryogenic couplings to a cryogenic hose manifold mounted on the marine manifold tower system. The marine manifold tower system includes an elongated tower extending between a first end and a second end with a seabed engagement mechanism at the first end of the elongated tower and the cryogenic hose manifold mounted on the second end of the elongated tower. An access system extending from the second end of the elongated tower along only a portion of the length of the elongated tower to an access platform disposed between the first end and the second end.

Turning to FIG. 1, a fluid cargo handling system 100 is provided that includes a standoff system 102 disposed to maintain a select stand-off distance D between a marine platform 110 and a fluid cargo transport vessel 200, such as a liquified gas carrier, which may include but is not limited to liquified natural gas (LNG) cargo, green ammonia, liquified petroleum gas, liquefied hydrogen gas or liquified carbon dioxide cargo or other cryogenic fuels, as well as other fluid cargos whether liquid or gas. Maintaining this stand-off distance is particularly desirable at times of strong current, high winds or rough seas in order to best protect the fluid cargo transport vessel 200 and the marine platform 110. Although not limited to a particular type of vessel or configuration, an illustrative fluid cargo transport vessel 200 is shown. In the illustration, fluid cargo transport vessel 200 may generally include a buoyant hull 202 supporting one or more liquid transport tanks 204. Fluid cargo transport vessel 200 may also include a liquid manifold assembly 206 for transferring liquid cargo. As used herein, a manifold assembly is a pipe fitting or similar device that connects multiple inputs or outputs.

The fluid cargo handling system 100 includes a marine platform 110 having a buoyant hull 112 with an upper deck 114 and a hull bottom 116. The marine platform 110 has an elongated first side 118 and an elongated second side 120 spaced apart from and generally opposing the elongated first side 118. In some embodiments, the buoyant hull 112 may include one or more columns 115 extending between the hull bottom 116 and the upper deck 114. In some embodiments, the buoyant hull 112 may be a barge. In any event, buoyant hull 112 may be characterized as having a centerline plane 157 generally parallel between first side 118 and second side 120 and passing through the center of gravity G of the buoyant hull 112. As such, it will be appreciated that plane 157 generally bisects marine platform 110 and buoyant hull 112.

The fluid cargo handling system 100 may also include a lifting and handling crane 124, which in some embodiments, may be mounted adjacent the upper deck 114. The fluid cargo handling system 100 includes at least one fluid transfer hose 132. In some embodiments, fluid cargo handling system 100 includes at least three fluid transfer hoses 132. In such embodiments, two of the fluid transfer hoses 132 may be cryogenic hoses and one hose may be a vapor hose. In any event, the one or more fluid transfer hoses 132 may each be mounted on a hose reel 128 carried by the marine platform 110. In some embodiments, the hose reel 128 may be mounted adjacent the second side 120 of marine platform 110 so as to be spaced apart from the first side 118 to facilitate activities between fluid cargo transport vessel 200 and the marine platform 110. As used herein, a hose may be any flexible tubular utilized for conveyance of a fluid.

A liquid manifold assembly 136 may carried by marine platform 110. In some embodiments, the liquid manifold assembly 136 is adjacent a first side 118 of marine platform 110 so as to be spaced apart from the hose reel(s) 128. The liquid manifold assembly 136 is in fluid communication with at least one of the one or more fluid transfer hoses 132. Liquid manifold assembly 136 also includes one or more fluid transfer hoses 138 which can be coupled to liquid manifold assembly 206 of fluid cargo transport vessel 200 to transfer liquid cargo between fluid cargo handling system 100 and fluid cargo transport vessel 200.

The fluid cargo handling system 100 includes a standoff system 102 to permit the marine platform 110 to be positioned adjacent a floating platform, such as a fluid cargo transport vessel 200 or a floating marine storage unit (see FIGS. 7 and 8) without the need for the fluid cargo handling system 100 to physically contact the floating platform. The standoff system 102 includes at least two drive systems 140 coupled to separate drivelines 146 all of which are specifically positioned relative to marine platform 110 to minimize the overall draft of fluid cargo handling system 100 while ensuring stability in of marine platform 110 during liquid cargo loading and unloading operations. Drive system 140 has at least a first drive device **142*a* carried by the marine platform 110 adjacent the first side 118 and a second drive device 142*b* carried by the marine platform 110 adjacent the second side 120. A first driveline 146*a* is engaged by the first drive device 142*a* and extends from adjacent the hull bottom 116 towards the second side 120 marine platform 110. Likewise, a second driveline 146*b* is engaged by the second drive device 142*b* and extends from adjacent the hull bottom 116 towards the first side 118 of marine platform 110. By positioning the drivelines 146*a*, 146*b* as described, the need for mechanisms to space the drivelines apart from the hull bottom 116 is minimized, and the stability of the marine platform 110** is increased over prior art arrangements.

As best seen in FIG. 1, drivelines 146 each extend away from marine platform 110 from adjacent a side 118, 120, and are thus spaced apart from plane 157. To the extent drivelines 146 exit through hull bottom 116, the exit point 150 is spaced apart from plane 157 and generally adjacent a side 118, 120.

While the drive devices 142 are preferably spaced apart from one another, such as on opposing sides 118, 120 of marine platform 110, they need not be so long as the exit point 150 for each driveline 146 is spaced apart from plane 157 but each driveline 146 extends under hull bottom 116 in a direction opposite from the exit point 150. For example, first driveline 146*a* exits hull bottom 116 at exit point 150*a* (which is generally adjacent first side 118) and then crosses back under hull bottom 116 so that first driveline 146*a* passes below second side 120. Likewise, second driveline 146*b* exits hull bottom 116 at exit point 150*b* (which is generally adjacent second side 120) and then crosses back under hull bottom 116 so that second driveline 146*b* pass below first side 118. In other embodiments, the respective drivelines 146 may not pass below a side, but still extend back under hull bottom 116 in the direction of a side that is opposite the side from where the driveline 146 exits the hull bottom 116. Thus, each driveline crosses back under hull bottom 116 to pass under the opposite side of marine platform 110. Marine platform 110 may be characterized as having a plane 157 through the center of gravity of hull bottom 116. First driveline 146*a* exits hull bottom 116 between plane 157 and first side 118 of marine platform 110 and then passes under hull bottom 116 through plane 157 back towards second side 120. Second driveline 146*b* exits hull bottom 116 between plane 157 and second side 120 of marine platform 110 and then passes under hull bottom 116 through plane 157 back towards first side 118. In any event, the drivelines 146 together allow marine platform 110, and thus fluid cargo handling system 100, to travel in at least two different directions. It should be noted that because drivelines 146 extend from buoyant hull 112 from adjacent hull bottom 116, such as at exit points 150, the overall draft of marine platform 110 can be minimized, while improving the stability of marine platform 110 over prior art marine platforms.

In one or more embodiments, the drive devices 142 are segregated from those locations adjacent the upper deck 114 where gaseous vapor from fluid cargo handling may be present. Buoyant hull 112 may include an interior 113 between the upper deck 114 and the hull bottom 116, with the first and second drive devices 142*a*, 142*b* positioned within the interior 113 of buoyant hull 112. In some embodiments, drive devices 142 may be positioned at a location below the upper deck 114. In the illustrated embodiment, marine platform 110 includes a second deck 117 spaced apart from the upper deck 114 and positioned between the upper deck 114 and the hull bottom 116. Drive devices 142*a*, 142*b* are positioned on the second deck 117 so as to be isolated from the fluid handling equipment on upper deck 114. In other embodiments, the drive devices 142 may be positioned within positive pressure enclosures 143, such as deck houses, positioned on the upper deck 114. In the latter embodiments, positive pressure enclosures 143 include an air handling system 145 to ensure an air overpressure inside the positive pressure enclosures 143 as compared to the outside environment, thereby ensuring that gaseous vapor from fluid cargo that may arise from fluid cargo transfer does not migrate to the drive devices 142. In one or more embodiments, the air handling system 145 may include indoor pressure sensor (not shown) disposed within the positive pressure enclosures 143 (or an air supply duct for the positive pressure enclosures 143) and an outdoor pressure sensor (not shown) disposed outside of the positive pressure enclosures 143. The air handling system 145 is disposed to ensure that the inside pressure within positive pressure enclosures 143 as measured by the indoor pressure sensor is higher than the outside pressure as measure by the outdoor pressure sensor. Thus, air handling system 145 may include a variable speed supply fan (not shown) to supply air to positive pressure enclosures 143. In one or more embodiments, the positive pressure enclosures 143 may be maintained at an air pressure range of 0.02 in. to 0.2 in water column (H20).

As described above, in some embodiments, buoyant hull 112 may include one or more columns 115 extending between the hull bottom 116 and the upper deck 114 within interior 113. Each column 115 may have a base attached to the hull bottom 116 with a drive device 142 mounted within column 115. Driveline 146 engaged by the drive device 142 extends down through the column 115 and extends from the base of the column 115 through the hull bottom 116 at exit point 150. Columns 115 may be vertical or angled. It will be appreciated that a column 115 as described may function as an elongated driveline guide for directing a driveline 146 through or along marine platform 110. In some embodiments, rather than being within the interior 113 of buoyant hull 112, columns 115 may extend adjacent sides 118, 120 of marine platform 110. Such an arrangement could permit existing marine platform to be retrofitted with standoff system 102.

In addition, a separate hull driveline guide 158 may be provided at exit point 150 where the driveline exits hull bottom 116. So as not to increase the overall draft of marine platform 110, as shown in FIG. 1, hull driveline guide 158 is a low-profile guide attached to hull bottom 116 utilized to direct a driveline 146 back under buoyant hull 112 as described herein. In one or more embodiments, hull driveline guide 158 is a roller. In one or more embodiments, hull driveline guide 158 may be a roller rotatably mounted to hull bottom 116 with a swivel. In one or more embodiments, hull driveline guide 158 is a cogged wheel disposed to engage a chain driveline.

In one or more embodiments, standoff system 102 may be dynamic and include one or more proximity sensors 141 utilized to actuate drive devices 142 in order to ensure that fluid cargo handling system 100 is maintained at a desired stand-off distance D from fluid cargo transport vessel 200 during fluid transfer operations. Drive system 140 can activate each drive device 142 to pay out or take up drivelines 146 in order to maintain the desired stand-off distance D. In this regard, it will be appreciated that the drive devices 142 may function in concert in order to maintain the desired stand-off distance D. In some embodiments, drive device 140 may include a controller 139 having a microprocessor 139' disposed to receive instructions regarding a desired offset distance and monitor proximity sensor 141 providing an actual offset distance D. Based on a comparison by the microprocessor 139' between the actual offset distance and the desired offset distance, controller 139 can actuate one or more drive devices to pay out or take in drivelines to achieve the desired offset distance. Although not limited to a particular type of sensor, in one or more embodiments, proximity sensor 141 may be an inductive proximity sensor, an optical proximity sensor, a capacitive proximity sensor, a magnetic proximity sensor and an ultrasonic proximity sensor. In addition to one or more proximity sensors 141 positioned adjacent first side 118, one or more proximity sensors 141 may also be positioned adjacent second side 120 of marine platform 110.

Figure 2:
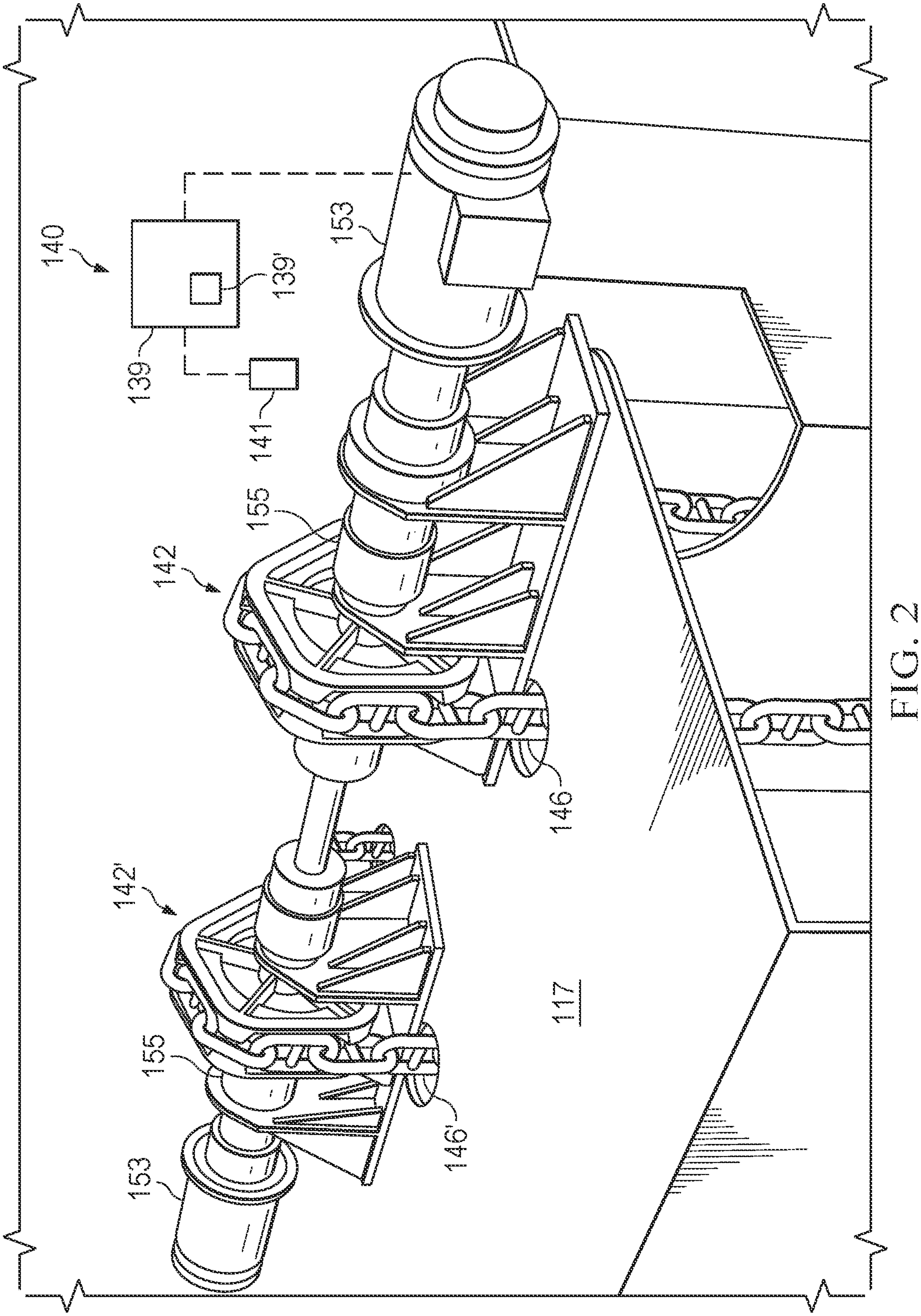
FIG. 2 is a partial elevation view of a drive device arrangement for a drive system of the disclosure.

As best seen in FIG. 2, where a drive device 142 and driveline 146 are deployed on marine platform 110 as a drive system 140, a second redundant drive device 142' and driveline 146' may be provided to ensure that any loss in operation of a primary drive device 142 will not impact operation of the drive system 140. In other words, while some embodiments of the drive system 140 may include only four drivelines 146, a drive system 140 with redundancy may include eight or more drive devices 142 and drivelines 146 for redundancy. Alternatively, each drive device 142 may be disposed to engage two separate drivelines 146, 146' for redundancy of the drivelines 146 without a redundant drive device 142'.

In some embodiments, the drive system 140 may have only two drive devices 142 and two drivelines 146, while in other embodiments, the drive system 140 may have only three drive devices 142 and three drivelines 146.

FIG. 2 also illustrates that each drive device 142 may include a drive motor 153 to power a drive wheel that engages a driveline 146, and a gear train, clutch or brake system 155 to ensure that driveline 146 does not slip, particularly during strong currents or rough seas. In some embodiments, drive device 142 is a spooling winch. Thus, as described, drive system 140 may utilize "chain-crawling" to move marine platform 110.

Figure 3:
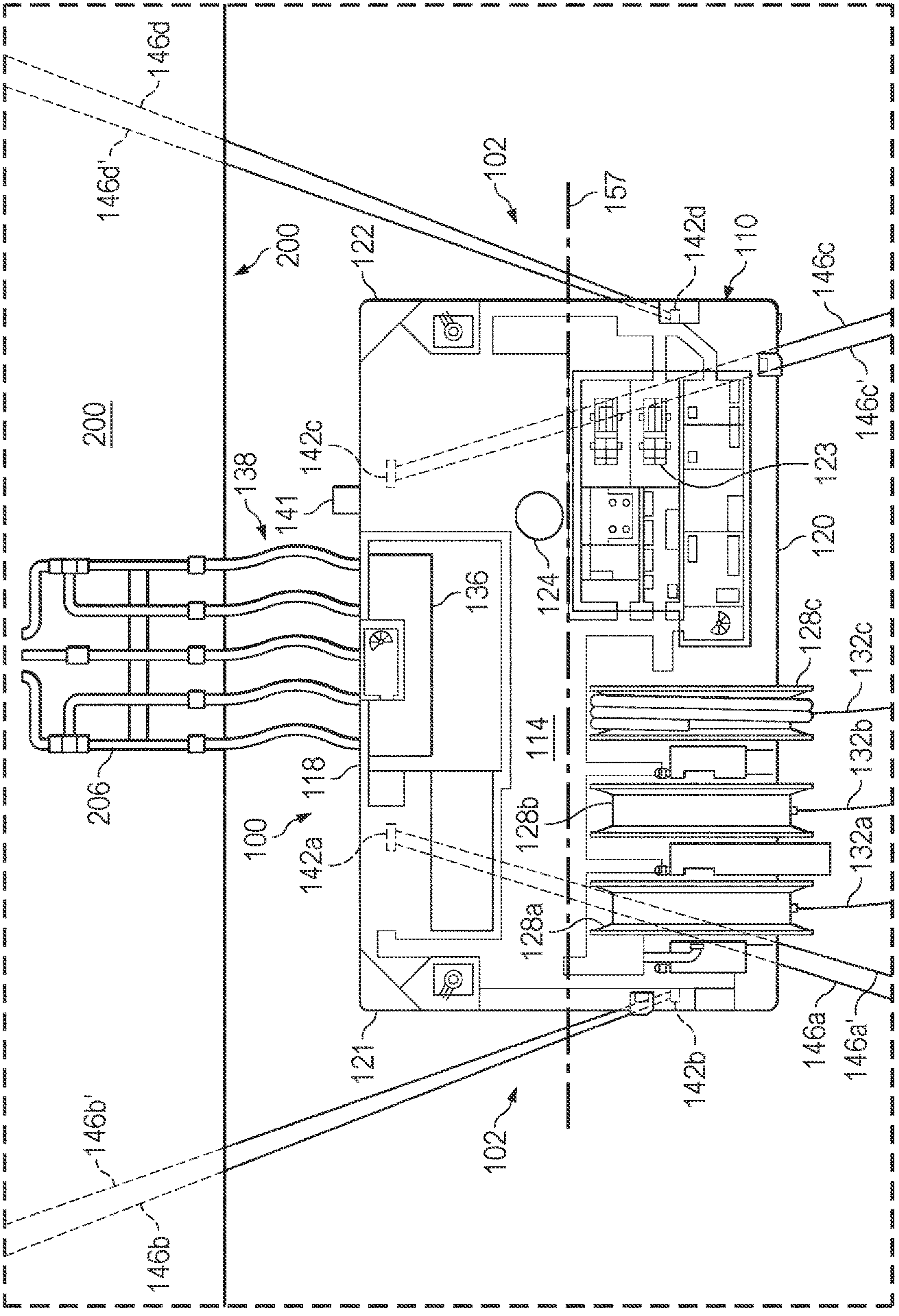
FIG. 3 is a plan view of a fluid cargo handling system of the disclosure.

With reference to FIG. 3, and ongoing reference to FIG. 1, a plan view of marine platform 110 of fluid cargo handling system 100 is shown. Marine platform 110 has a first side 118 spaced apart from a second side 120, and further includes a first end 121 and a second end 122. One or both of first and second sides 118, 120 may be elongated. An upper deck 114 extends between first side 118 and second side 120. Notably, plane 157 passes through each of first end 121 and a second end 122.

As can be seen, positioned along the upper deck 114 of marine platform 110 are one or more hose reels 128. In the illustrated embodiment, three hose reels **128*a*, 128*b*, 128*c* are shown. In some embodiments, as shown, hose reel(s) 128 may be positioned on marine platform 110 adjacent second side 120. Each hose reel 128 may have a fluid transfer hose 132 mounted thereon, such as fluid transfer hoses 132*a*, 132*b* and 132*c*, respectively. One or more fluid transfer hoses 132 may be cryogenic hoses for transfer of cryogenic fluid cargo. In one or more embodiments, fluid transfer hoses 132 may be floating hoses (see FIGS. 8 and 9). While marine platform 110 is described as having at least one hose reel 128 in order to manage fluid transfer hoses 132, in other embodiments, marine platform 110 need not include hose reels. However, it will be appreciated that hose reels 128 allow fluid transfer hoses 132 to be paid out and taken in as marine platform 110 moves away from and towards a marine platform to which fluid transfer hoses 132 are attached, such as the floating storage unit 300 shown in FIGS. 7 and 8 or the tower shown in FIGS. 9 and 10**.

Also shown positioned adjacent upper deck 114 is a liquid manifold assembly 136 fluidically coupled to one or more fluid transfer hoses 138. In some embodiments, as shown, liquid manifold assembly 136 may be positioned on marine platform 110 adjacent first side 118, spaced apart from hose reels 128. Liquid manifold assembly 136 may also be supported above upper deck 114. In this regard, in some embodiments, liquid manifold assembly 136 is elevated at least 16 meters above sea level. In any event, fluid transfer hose hoses 132 are fluidically coupled to liquid manifold assembly 136 so as to be in fluid communication with one or more of fluid transfer hoses 138.

A handling crane 124 may be mounted adjacent upper deck 114 and utilized to manipulate fluid transfer hoses 138. Pumping equipment 123 may also be provided on marine platform 110 in order to pump fluid through one or more of fluid transfer hoses 132 and 138. In one or more embodiments, hose reels 128 may be located adjacent the second side 120 of marine platform 110 and the liquid manifold assembly 136 may be located adjacent the first side 118 of marine platform 110.

Shown in FIG. 3 are four drivelines 146, each with a redundant driveline 146' as described above, each of which is independently driven by a drive device 142. In the illustrated embodiment, four drive devices are shown, each spaced apart from one another, where a first drive device **142*a* engages a first driveline 146*a* with a redundant first drive device 142*a*' engaging a redundant first driveline 146*a*'. Likewise, a second drive device 142*b* engages a second driveline 146*b* with a redundant second drive device 142*b*' engaging a redundant second driveline 146*b*'; a third drive device 142*c* engages a third driveline 146*c* with a redundant third drive device 142*c*' engaging a redundant third driveline 146*c*'; and a fourth drive device 142*d* engages a fourth driveline 146*d* with a redundant fourth drive device 142*d*' engaging a redundant fourth driveline 146*d*'. As shown, the first drive device 142*a* and the third drive device 142*c* are each positioned adjacent the first side 118 of marine platform 110 and spaced apart from one another, with the first drive device 142*a* adjacent to or closer to the first end 121 of marine platform 110 and the third drive device 142*c* adjacent to or closer to the second end 122 of marine platform 110. The first and third drive devices 142*a*, 142*c* each engage their respective drivelines 146*a*, 146*c* which extend under marine platform 110 away from first side 118 so as to pass across buoyancy plane 157 towards second side 120. In other words, drivelines 146*a*, 146*c* do not pass under first side 118**.

Similarly, the second drive device **142*b* and the fourth drive device 142*d* are each positioned adjacent the second side 120 of marine platform 110 and spaced apart from one another, with the second drive device 142*b* adjacent to or closer to the first end 121 of marine platform 110 and the fourth drive device 142*d* adjacent to or closer to the second end 122 of marine platform 110. The second and fourth drive devices 142*b*, 142*d* each engage their respective drivelines 146*b*, 146*d* which extend under marine platform 110 away from second side 120 so as to pass across buoyancy plane 157. In other words, drivelines 146*b*, 146*d* do not pass under second side 120**.

Figure 4:
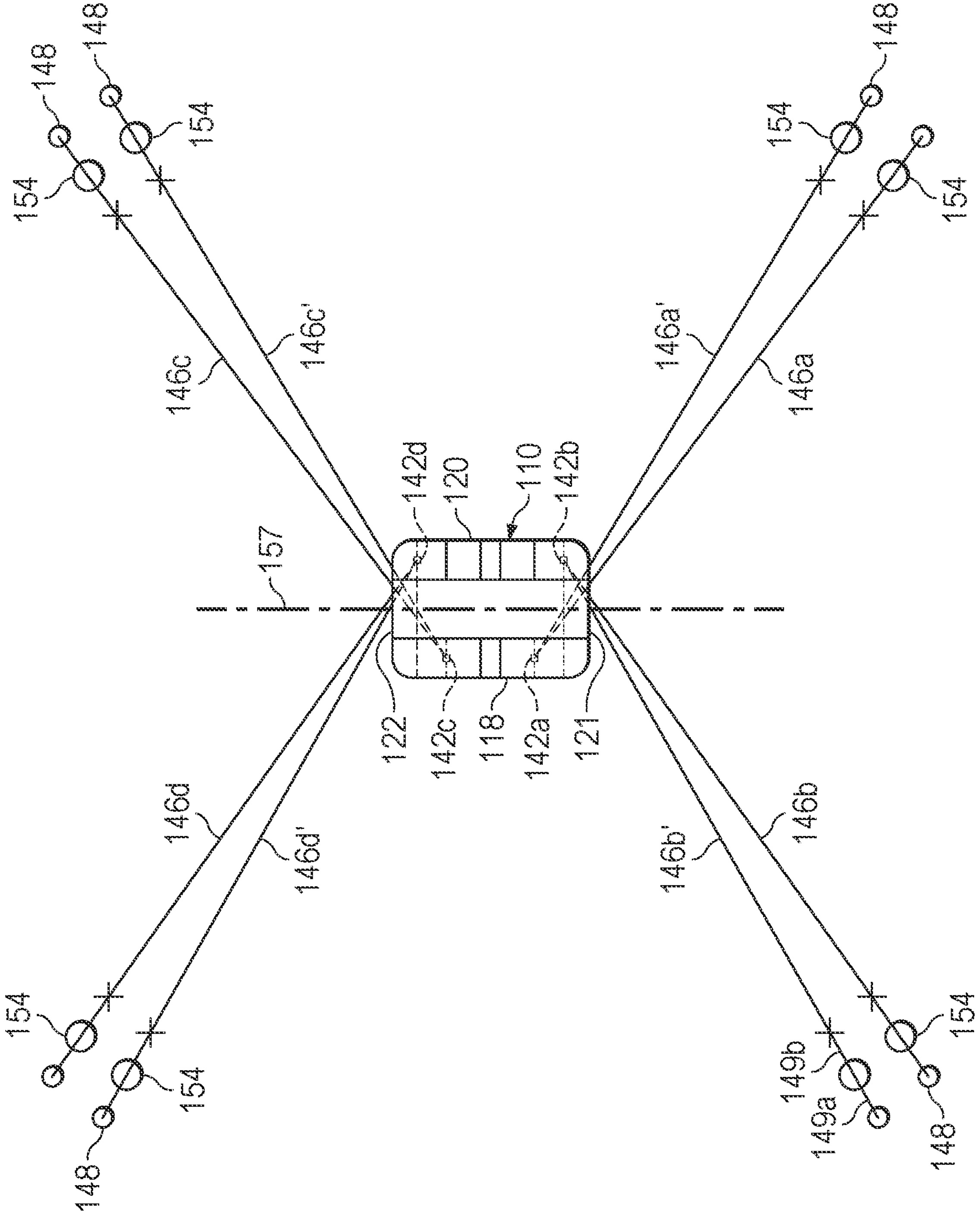
FIG. 4 is a plan view of driveline anchor system for a fluid cargo handling system of the disclosure.

FIG. 4 is another plan view similar to FIG. 3, but further illustrating the mooring of drivelines **146*a*, 146*a*', 146*b*, 146*b*', 146*c*, 146*c*', 146*d* and 146*d*'. It will be appreciated that while the redundant drivelines 146*a*', 146*b*', 146*c*' and 146*d*' are shown and their drive devices 142 may be described, they are not necessary. In any event, as shown in FIG. 4, drive devices 142*a* and 142*c* are positioned adjacent first side 118 of marine platform 110. Each of drive devices 142*a* and 142*c* engage a driveline 146*a*, 146*c*, respectively, that extends away from first side 118, under hull bottom 116, through plane 157 and past second side 120. Drive devices 142*b* and 142*d* are positioned adjacent second side 120 of marine platform 110. Each of drive devices 142*b* and 142*d* engage a driveline 146*b*, 146*d*, respectively, that extends away from second side 120, under hull bottom 116, through plane 157 and past first side 118. In one or more embodiments, drive devices 142*a* and 142*c* along first side 118 of marine platform 110 are spaced apart from one another, and drive devices 142*b* and 142*d* along second side 120 of marine platform 110 are spaced apart from one another. Each driveline 146, upon exiting hull bottom 116 as described above such as at 150, extends under hull bottom 116 in a direction opposite from where the driveline 146 exited the hull bottom 116 at 150**.

Figure 5:
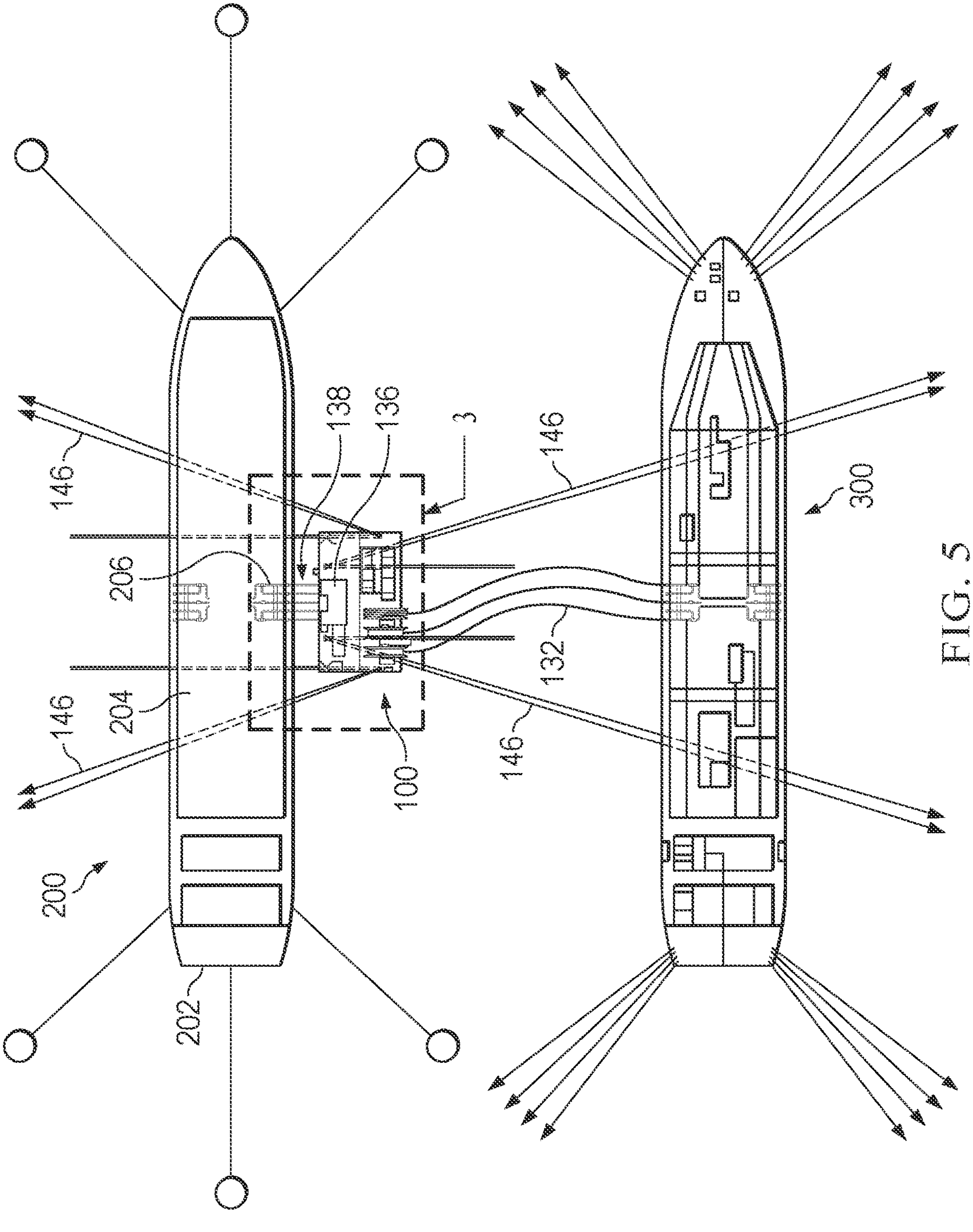
FIG. 5 is a plan view of a fluid cargo handling system disposed between two marine platforms.

In one or more embodiments, drivelines 146 may be spread moored such as is shown in FIGS. 4 and 5. In this regard, the drivelines 146 extending from adjacent any given side 118, 120 of marine platform 110 form a trapezoidal shape spread mooring (where the respective drive devices 146 along the given side 118, 120 are spaced apart from one another). In other embodiments, the drivelines 146 adjacent any given side 118, 120 of marine platform 110 form a triangular shape spread mooring (where the respective drive devices 146 along any given side 118, 120 are adjacent one another).

Figure 6:
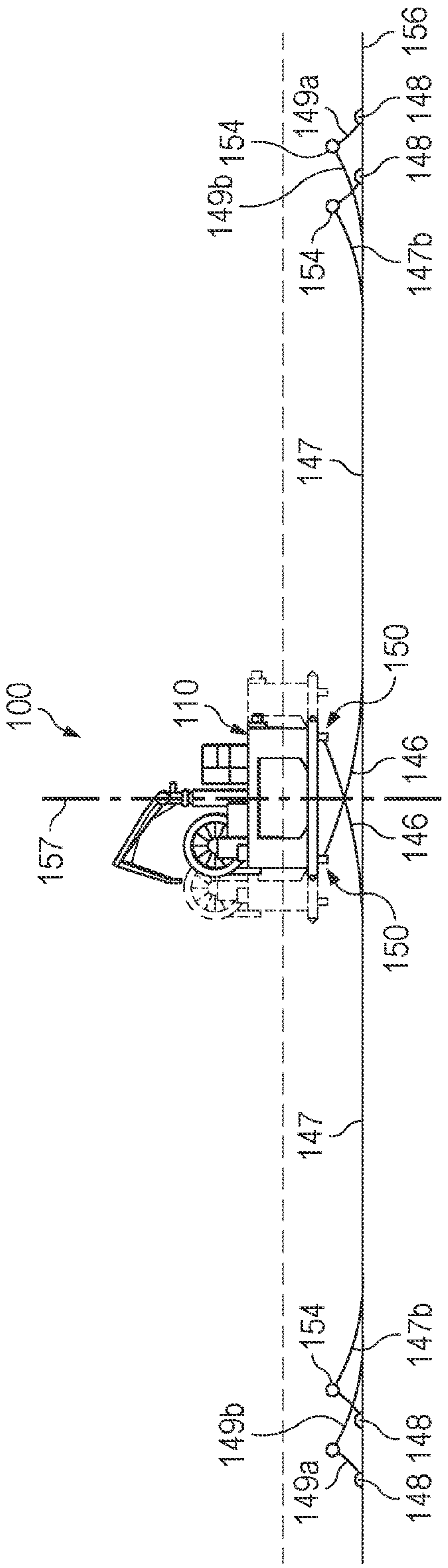
FIG. 6 is an elevation view of a fluid cargo handling system of the disclosure illustrating the driveline anchor system of the disclosure.

With reference to FIG. 6 and continued reference to FIG. 4, it can be seen that in one or more embodiments, a driveline anchor system 152 may be provided to ensure that each driveline 146 is anchored to the ocean floor 156 while minimizing loads placed on driveline 146 by currents, waves and weather. A stiff or rigid line, such as a chain or semi-rigid cable, is more susceptible to snap loads, particularly where the moorings are to remain in place for extended periods of time, such as the case with the drivelines 146 and fluid cargo handling system 100, which may be deployed for months or years. To alleviate such snap loads, the driveline anchor system 152 absorbs shocks from waves, currents and the weather, that might otherwise be placed on the drivelines 146. As shown, each driveline 146 includes a chain 147 having a first end **147*a* engaged by a drive device 142 and a second end 147*b* that is attached to an elastic line 149, which in turn is secured to an anchor 148. In other embodiments, chain 147 may be replaced with a non-buoyant cable which can be engaged by a drive device 146. In one or more embodiments, the elastic line 149 may be buoyant, such as a rope. In one or more embodiments, it will be appreciated that because of the extended period of time that fluid cargo handling system 100 may be deployed, it is desirable to ensure that the elastic line 149 does not lie on the seabed, where sand and other debris can diminish the operational life of the elastic line. For this reason, driveline anchor system 152 includes a buoy 154 disposed along elastic line 149 to support elastic line 149 above the ocean floor 156. Thus, elastic line 149 may include a first elastic line portion 149*a* interconnecting the anchor 148 to buoy 154 and a second elastic line portion 149*b* interconnecting the second end 147*b* of chain 147 to buoy 154**.

Figure 7A:
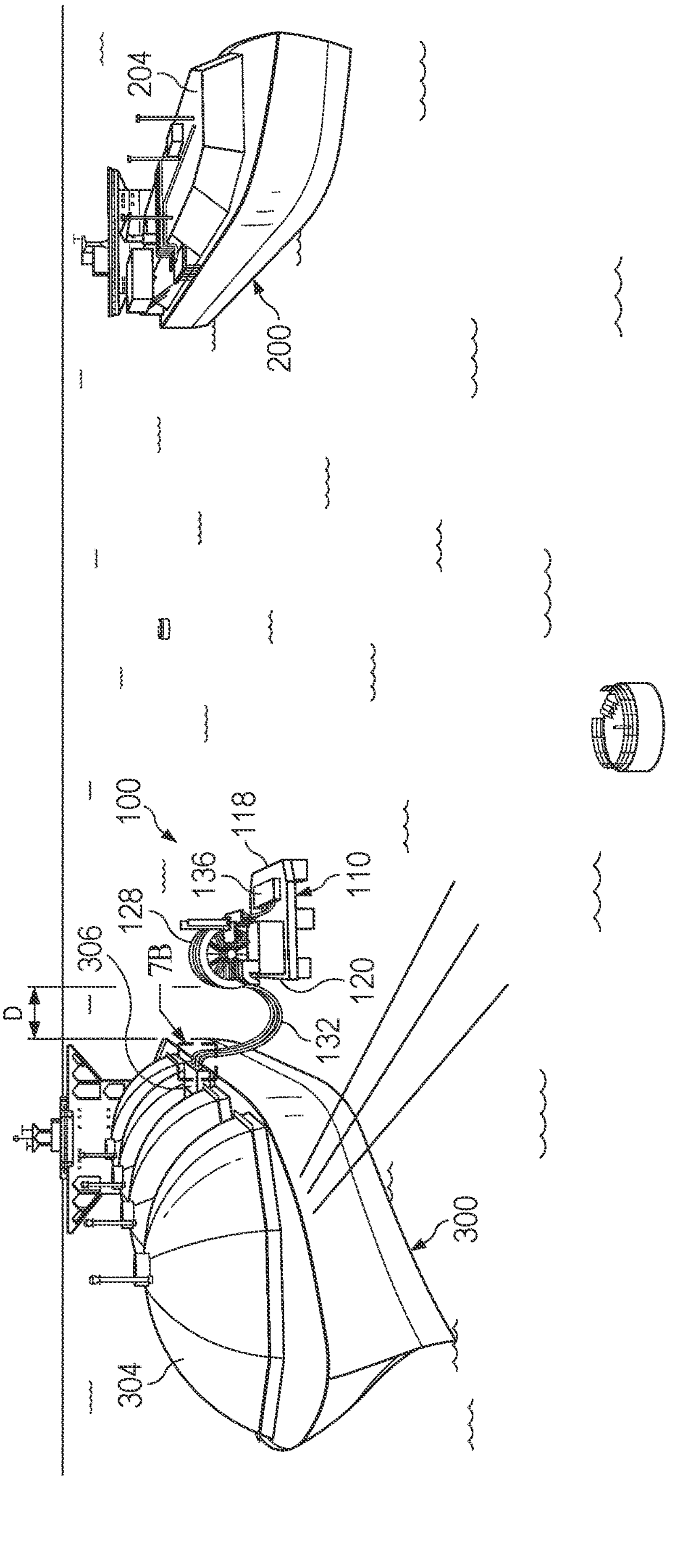
FIG. 7A is a perspective view of a fluid cargo handling system of the disclosure disposed adjacent a floating storage unit.
Figure 7B:
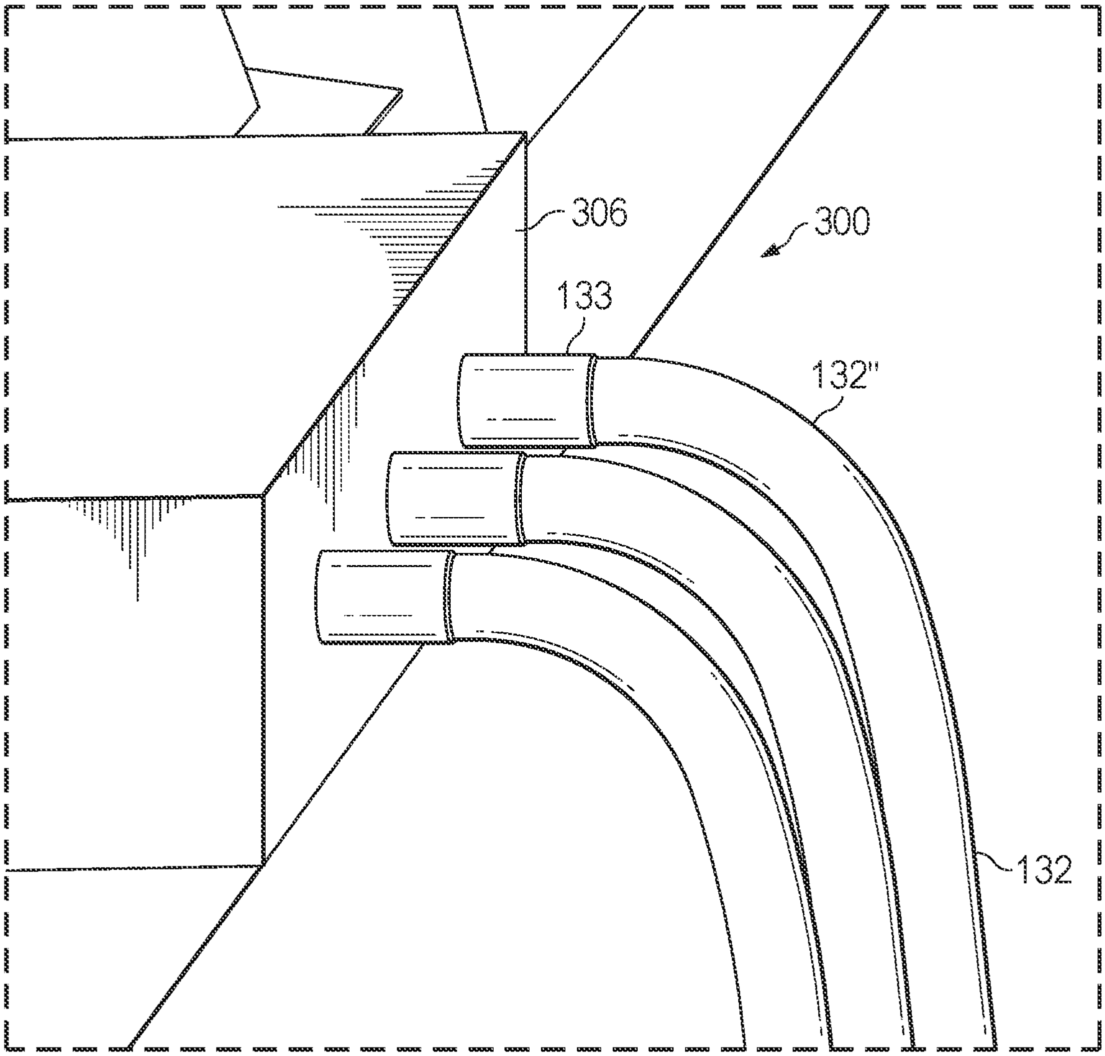
FIG. 7B is a close-up perspective view of a liquid manifold on the floating storage unit of FIG. 7A.

FIGS. 7A and 7B illustrates fluid cargo handling system 100 adjacent a marine platform, in this case a floating storage unit 300 having a liquid manifold assembly 306 in fluid communication with a liquid cargo storage tank 304. As can be seen, marine platform 110 is fluidically coupled to liquid manifold assembly 306 of floating storage unit 300 by cryogenic hoses 132 utilizing cryogenic couplers 133. Notably, all cryogenic couplers 133 for cryogenic hoses 132 are maintained above the water. In any event, the cryogenic hoses 132 are shown stored on hose reels 128. When fluid cargo handling system 100 is not being used to transfer liquid cargo, it may be positioned in a storage configuration adjacent floating storage unit 300 so that the second side 120 of marine platform 110 is adjacent to, but standing off a distance D, from floating storage unit 300 utilizing the standoff system 102 described above.

Figure 8:
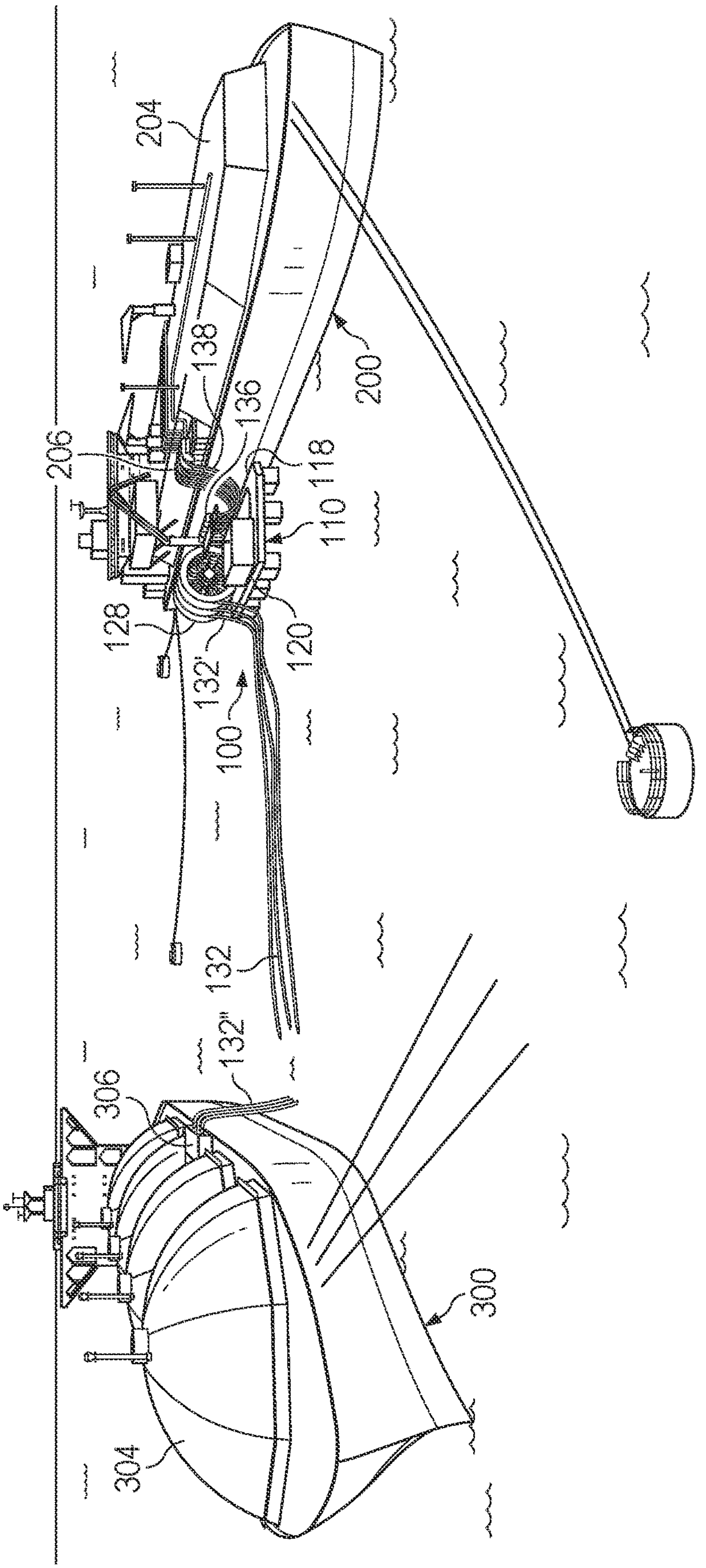
FIG. 8 is a perspective view of a fluid cargo handling system of the disclosure disposed adjacent a fluid cargo transport vessel while fluidically coupled to a floating storage unit.

FIG. 8 illustrates fluid cargo handling system 100 adjacent a fluid cargo transport vessel 200 that is moored apart from floating storage unit 300. A first end 132' of the first fluid transfer hose 132 carried on the hose reel 128 on marine platform 110 is in fluid communication with the liquid manifold assembly 136 carried by marine platform 110 and a second end 136" of the first fluid transfer hose 136 is coupled to and in fluid communication with the liquid manifold assembly 306 carried by the floating storage unit 300. When marine platform 110 is positioned adjacent fluid cargo transport vessel 200, a first end 138' of the second fluid transfer hose 138 is coupled to and in fluid communication with the liquid manifold assembly 136 carried by the marine platform 110 and a second end 138" of the of the second fluid transfer hose 138 is coupled to and in fluid communication with the liquid manifold assembly 206 carried by the fluid cargo transport vessel 200. While the marine platform 110 is positioned adjacent the fluid cargo transport vessel 200 to allow the second fluid transfer hose 138 to be coupled to the liquid manifold assembly 206 carried by the fluid cargo transport vessel 200, the standoff system 102 maintains marine platform 110 spaced apart a distance D from the fluid cargo transport vessel 200 so that marine platform 110 does not touch fluid cargo transport vessel 200. In other words, first side 118 of marine platform 110 is maintained a desired standoff distance away from fluid cargo transport vessel 200 as described above.

Figure 9:
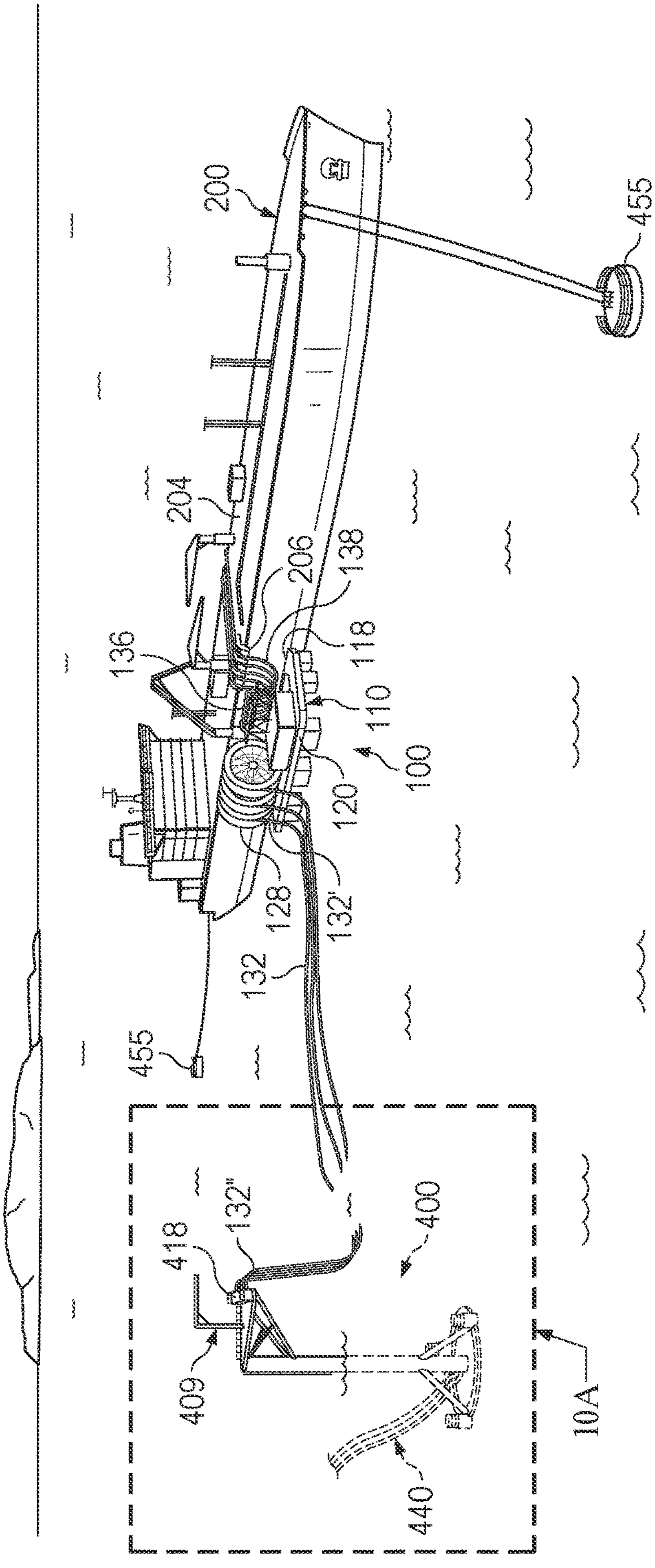
FIG. 9 is a perspective view of a fluid cargo handling system disposed between a marine platforms and a marine manifold tower system of the disclosure.

Turning to FIGS. 9 and 10, rather than a floating storage unit 300 as shown in FIGS. 7 and 8, the fluid cargo handling system 100 includes a marine manifold tower system 400 to transfer liquid cargo between a fluid cargo transport vessel 200 and a remote location, such as an on-shore terminal or another offshore terminal. As described in more detail below, marine manifold tower system 400 is particularly well suited for handling of liquid cargo that is cryogenic liquid cargo. In this regard, liquid cargo transfer hoses 132 are cryogenic hoses and for the purposes of describing marine manifold tower system 400, liquid cargo transfer hoses 132 will be referred to as cryogenic hoses 132 for one or more embodiments of marine manifold tower system 400. Moreover, while marine platform 110 shown in FIG. 9 may include a standoff system 102 as described above and is particularly well suited to function with marine manifold tower system 400, marine platform 110 need not include such a standoff system 102. Rather, marine platform 110 may simply include a buoyant hull 112 as described above supporting at least two cryogenic hoses 132 carried on marine platform 110, each cryogenic hose 132 having a first end 132' and a second end 132", where the first end 132' of each first cryogenic hose 132 is coupled to and in fluid communication with a liquid manifold assembly 136 carried by the marine platform 110.

The second end 132" of each cryogenic hose 132 is connected to the marine manifold tower system 400 via cryogenic couplers 133. The marine manifold tower system 400 includes a submerged seabed conveyance system 440 to enable cryogenic liquid cargo transfer activities such as are described herein to be located offshore, in some cases 5 kilometers or more from shore, but above the seabed and waterline, thereby prolonging the integrity of the cryogenic couplers 133 utilized between cryogenic hose(s) 132 and submerged seabed conveyance system 440 and avoiding the need for a seabed pipe line end manifold (PLEM) and risers as is common in the industry.

Generally, the marine manifold tower system 400 includes an elongated tower 404 having a first end 408 and a second end 410 with a waterline 411 defined therebetween. The first end 408 of the tower 404 includes a seabed engagement mechanism 414 for engaging ocean floor 413. The second end 410 of the tower 404 includes one or more cryogenic hose manifold assemblies 418 for coupling to cryogenic hoses 132, and in particular, the second end 132" of hoses 132 utilizing cryogenic couplers 133. In one or more embodiments, a connection platform 432 is disposed at the second end 410 of the elongated tower 404 and on which the one or more cryogenic hose manifold assemblies 418 are mounted. In one or more embodiments, a handling device 409, such as a crane, davit or winch, for handling of fluid transfer hoses 132 is also mounted on connection platform 432. Importantly, all cryogenic couplers 133 between the second end 132" of hoses 132 and a cryogenic hose manifold assembly 418 are spaced apart from waterline 411 above waterline 411 so that no essential components of the cryogenic couplers 133 are submerged, it being appreciated that the extreme temperature differences between the cryogenic fluid cargo carried by fluid transfer hoses 132 and the ocean water, as well as the corrosive nature of the ocean water, could significantly impact the cryogenic couplings more so than couplings for standard temperature and pressure liquids. As such, the marine manifold tower system 400 is particularly desirable for cryogenic liquid transfer, such as green ammonia transfer, LNG transfer or liquified propane gas (LPG) transfer, while allowing the fluid cargo transport vessel 200 to remain safely offshore.

In one or more embodiments, marine manifold tower system 400 further includes an access system 424 mounted along elongated tower 404 and extending from the second end 410 of the elongated tower 404 along only a portion of the length of the elongated tower 404 to an access platform 428 disposed between the first end 408 and the second end 410. Access system 424 may include a ladder 429 or stairs extending from access platform 428 to connection platform 432. In one or more embodiments, the access platform 428 is positioned to be at or above the waterline 411 to permit personnel access from a marine vessel (not shown) moored adjacent the access platform 428. In one or more embodiments, the access system 424 may be within elongated tower 404 allowing access to connection platform 432 through an interior passage 433 of elongated tower 404, thereby protecting personnel from the environment.

Figure 10A:
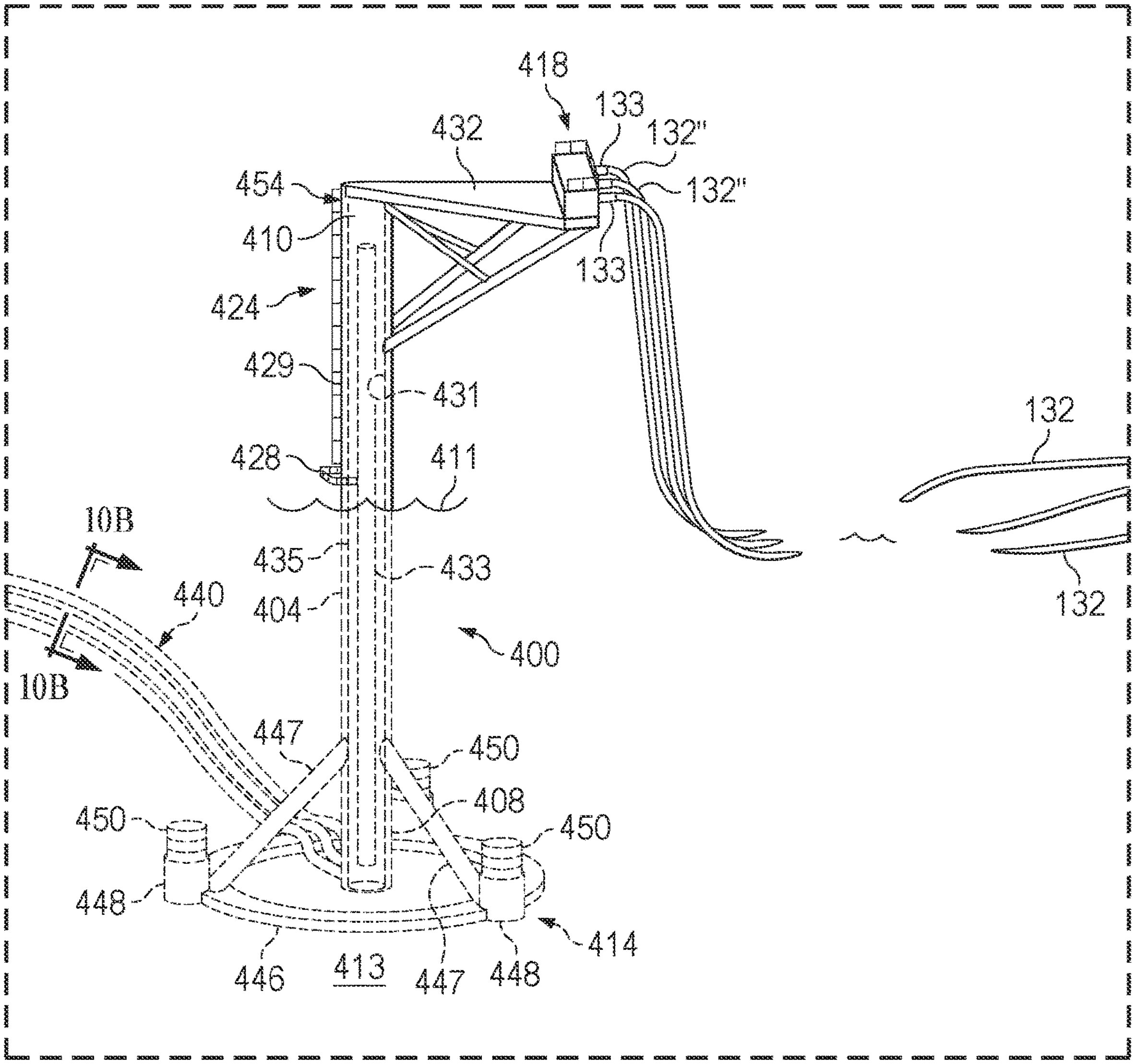
FIG. 10A is a perspective view of a fluid cargo handling system connected to a marine manifold tower system of the disclosure.
Figure 10B:
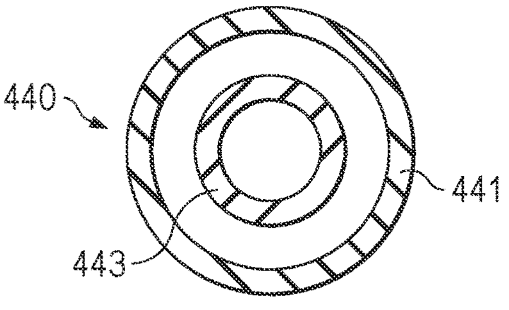
FIG. 10B is a cross-section of one embodiment of seabed conveyance system for cryogenic fluids used with the marine manifold tower system of FIG. 10A.

Elongated tower 404 is formed of a hollow tubular 431 having an interior passage 433 through which one or more internal cryogenic tubulars 435 extend from adjacent the first end 408 to the second end 410 of elongated tower 404, fluidically coupling cryogenic hose manifold assembly 418 to a seabed conveyance system 440. In one or more embodiments, cryogenic tubulars 435 may form part of seabed conveyance system 440. As shown in FIG. 10B, in one or more other embodiments, seabed conveyance system 440 includes an outer tubular 441 and an inner tubular 443, wherein the inner tubular 443 is in fluid communication with an internal cryogenic tubular 435 extending through elongated tower 404, while in other embodiments, cryogenic tubular 435 within interior passage 433 are an extension of inner tubular 443. In operation, cryogenic liquid can be pumped through cryogenic hose manifold assembly 418, through internal cryogenic tubulars 435, and through seabed conveyance system 440 between a fluid cargo transport vessel 200 and a location remote from marine manifold tower system 400, such as an on-shore location. Because cryogenic hose manifold assembly 418 is supported above the waterline 411, the integrity of cryogenic couplers 133 can be preserved.

While marine manifold tower system 400 has been described as being fluidically coupled to a fluid cargo handling system 100 as described herein via one or more cryogenic hose 132, in other embodiments, a cryogenic hose 132 coupled to marine manifold tower system 400 may be an aerial hose extending directly between elongated tower 404 and a floating storage unit 300 or fluid cargo transport vessel 200 moored adjacent to elongated tower 404.

In one or more embodiments, tower 404 is a mono pole or single mast tower with a single leg, namely the first end 408 of the tower 404, disposed to engage the ocean floor 413, while in other embodiments, tower 404 may be another type of tower, including but not limited to lattice tower with two or more legs (not shown), tripod and jacket towers. In any case, as best seen in FIG. 10A, a seabed engagement mechanism 414 may be utilized to secure elongated tower 404 to the ocean floor 413. Seabed engagement mechanism 414 may include a support structure 446 extending around at least a portion of the first end 408 of the tower 404. In some embodiments, support structure 446 may be a ring or circular structure extending around first end 408 of the tower 404. As shown, support structure 446 has a diameter that is larger than first end 408 of the tower 404 with one or more struts 447 extending between support structure 446 and tower 404 to secure support structure 446 to tower 404. In one or more embodiments, multiple support structures 446 may be concentrically disposed around first end 408 of the tower 404 with consecutively increasing diameters. Each support structure 446 may include at least two sleeves 448 spaced apart from one another on support structure 446. Each sleeve 448 incudes a piling 450 extending through the sleeve 448 to secure the support structure 446 to the ocean floor 413. In other embodiments, seabed engagement mechanism 414 may take other forms.

Figure 11:
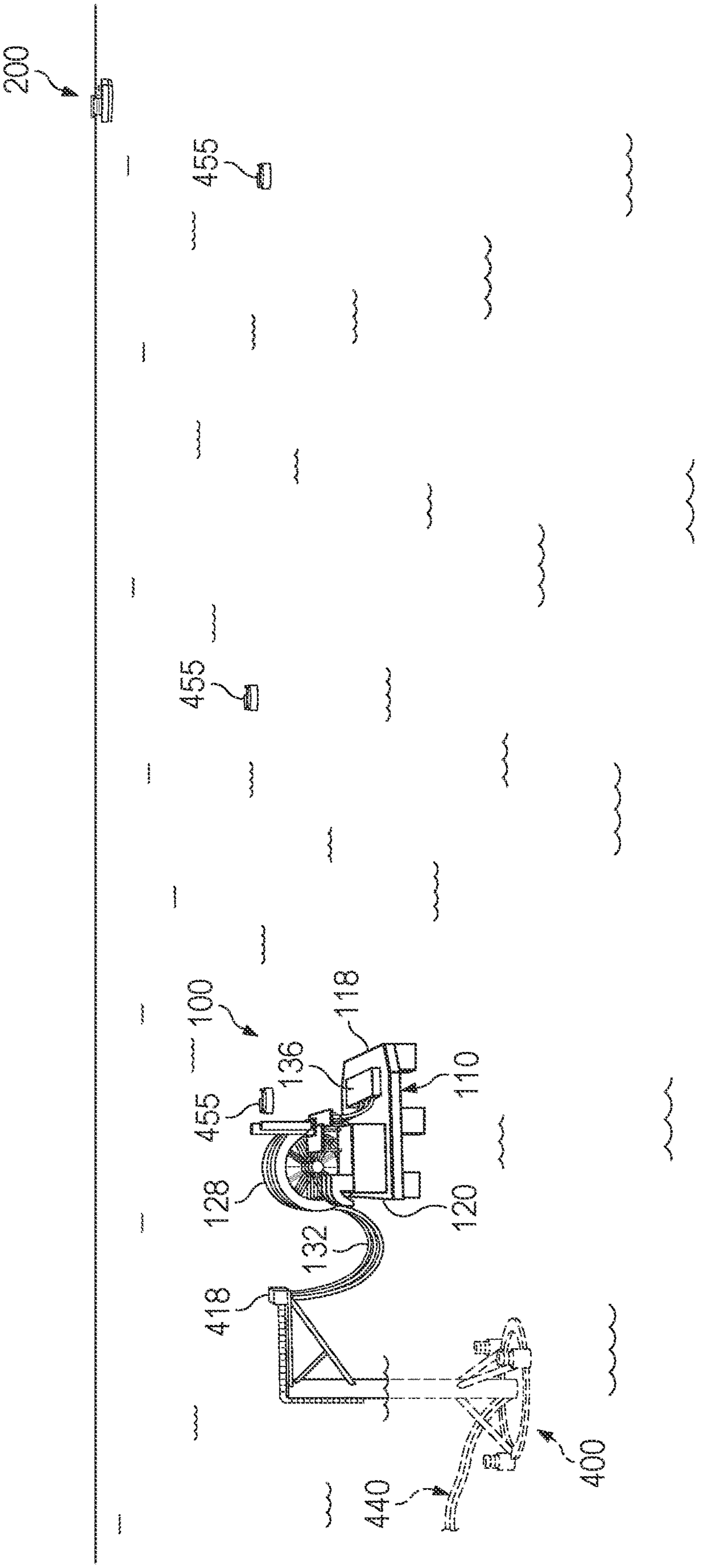
FIG. 11 is a perspective view of a marine manifold tower system of the disclosure.

As best seen in FIG. 11, where cryogenic hoses 132 extend from a fluid cargo handling system 100, fluid cargo handling system 100 may be secured adjacent marine manifold tower system 400 when there is not a floating fluid cargo transport vessel 200 in the vicinity of marine manifold tower system 400. This allows cryogenic hoses 132 to be stowed onboard fluid cargo handling system 100, and in particular, on hose reel 128, when a fluid cargo transport vessel 200 is not present, thereby preserving the integrity of cryogenic hoses 132 in order to extend their function life. In FIG. 11, a fluid cargo transport vessel 200 is seen approaching adjacent marine manifold tower system 400 to which fluid cargo handling system 100 is fluidically coupled, while in FIG. 9, fluid cargo transport vessel 200 is shown moored in the vicinity of marine manifold tower system 400. Moorings points 455 are shown disposed apart from marine manifold tower system 400, allowing fluid cargo transport vessel 200 to be moored apart from marine manifold tower system 400, after which, fluid cargo handling system 100 may travel to a position adjacent fluid cargo transport vessel 200 for fluidically coupling thereto. While fluid cargo handling system 100 may include a standoff system 102 as described herein, in other embodiments, fluid cargo handling system 100 may be moored directly to fluid cargo transport vessel 200 when fluidically coupling marine manifold tower system 400 to fluid cargo transport vessel 200.

Figure 12:
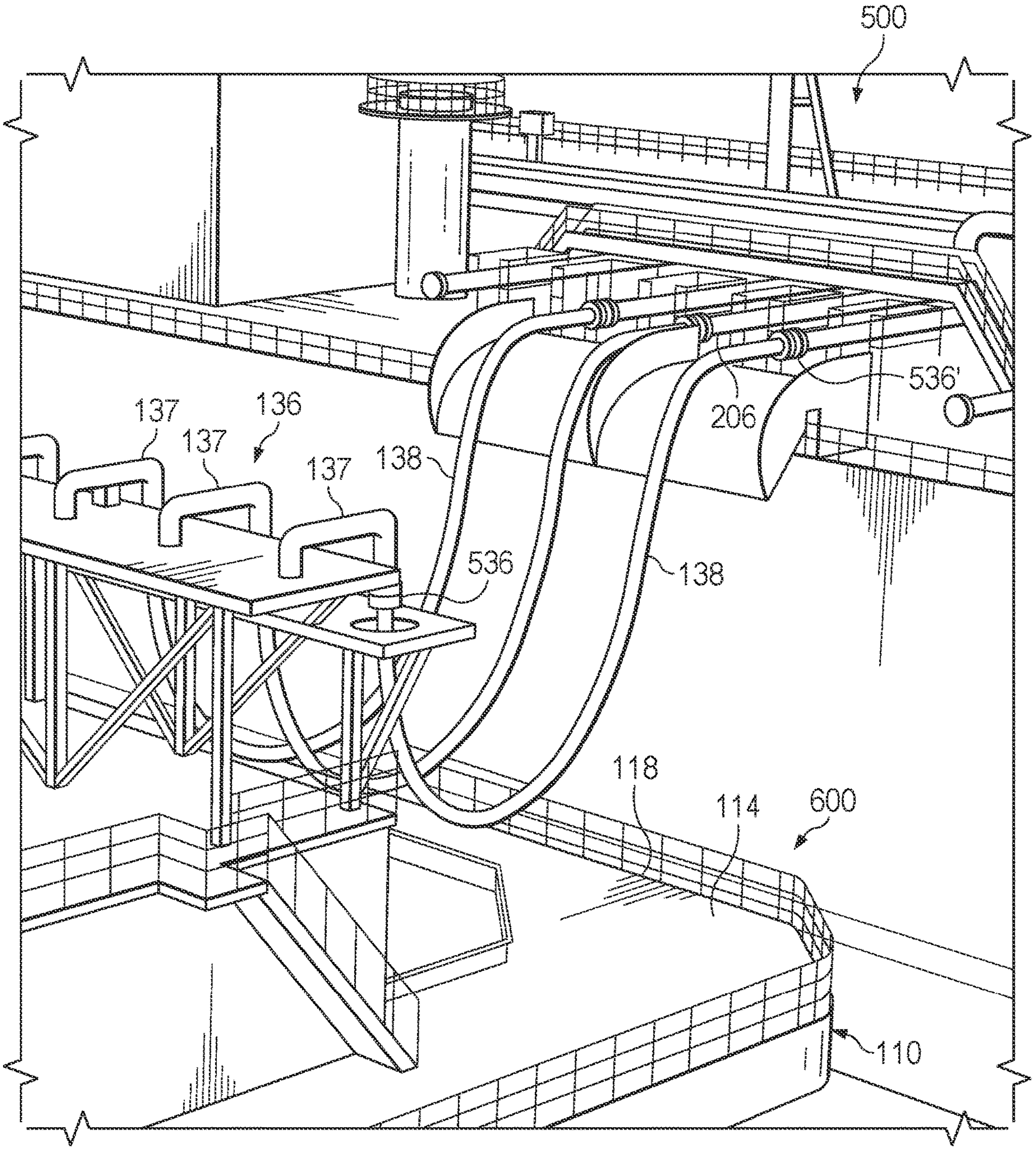
FIG. 12 is a perspective view of a fluid cargo handling system disposed of the disclosure disposed adjacent a fluid cargo vessel.

With reference to FIG. 12, a quick release manifold system 536 is illustrated. Quick release manifold system 536 may be used with any fluid manifold assembly, but is particularly useful for marine applications, such as with marine vessels 200, 300 as described herein, or fluid cargo handling system 100 described above (whether such fluid cargo handling system 100 includes a standoff system 102 or not) or any liquid manifold assembly described herein. Moreover, quick release manifold system 536 need not be used with a pipe manifold assembly at all, but may be used when coupling any flow tubulars to one another, such as directly coupling a first fluid transfer hose to a second fluid transfer hose, much like first and second fluid transfer hoses 132, 138, respectively, discussed above. For illustrative purposes however, quick release manifold system 536 is shown in relation to a liquid cargo marine vessel 500 and fluid cargo handling system 600. While quick release manifold system 536 will be described as primarily carried on fluid cargo handling system 600 in association with liquid manifold assembly 136 for illustrative purposes, it will be understood that any liquid cargo marine vessel 500 may include a quick release manifold system 536' where there is a concern that toxic or harmful liquid or gas may be present in a fluidic coupling that must be released quickly.

Figure 13:
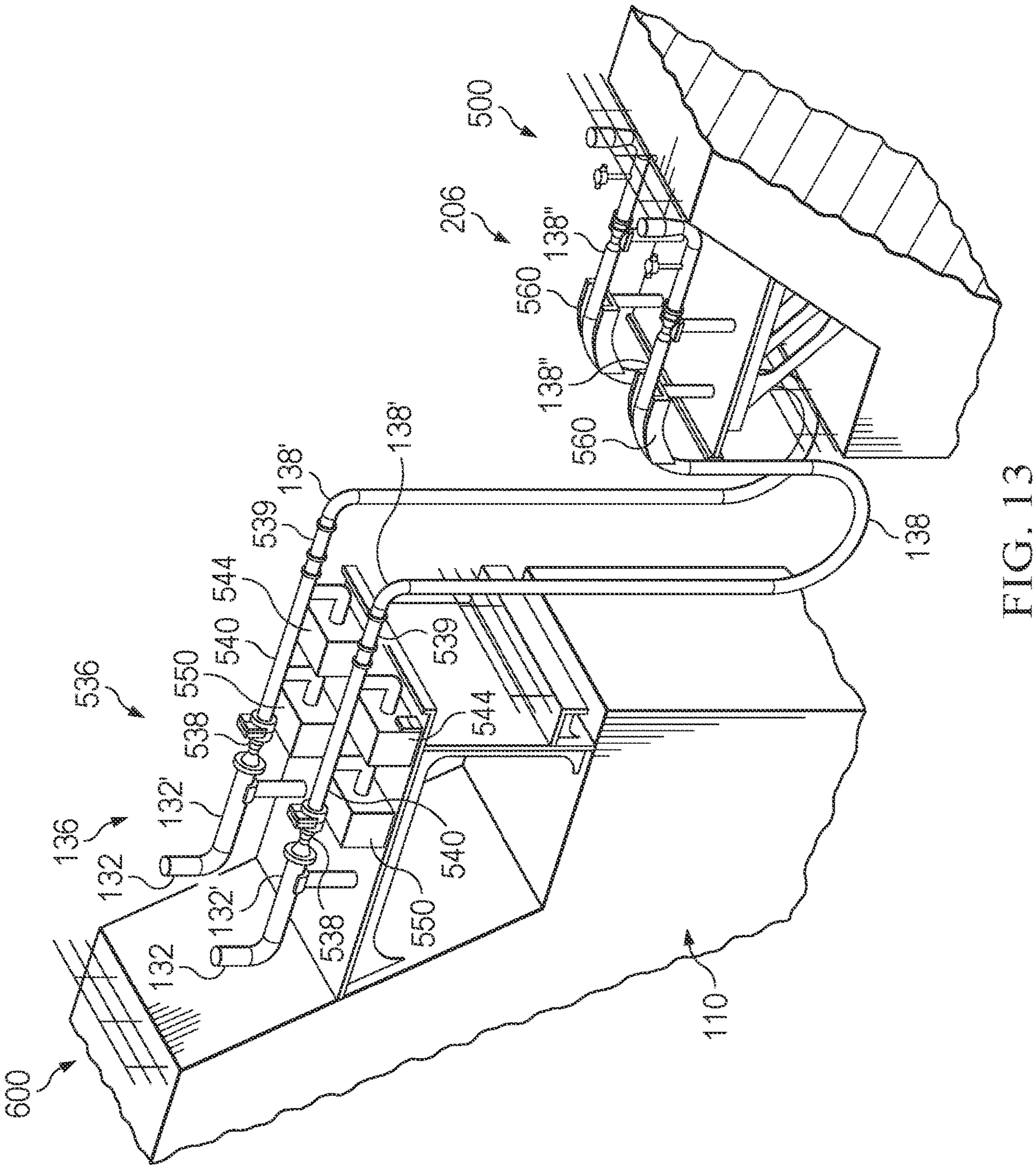
FIG. 13 is a partial perspective view of quick release manifold system of the disclosure.

Quick release manifold system 536 is shown in more detail in FIG. 13 in relation to liquid manifold assembly 136 of fluid cargo handling system 600. Fluid cargo handling system 600 includes a marine platform 110 on which is mounted a liquid manifold assembly 136 in fluid communication with a fluid transfer hose 132 as described above. Liquid manifold assembly 136 is fluidically coupled via fluid transfer hose 138 as described above to a liquid manifold assembly 206 of liquid cargo marine vessel 500.

A first valve 538 forming part of a liquid manifold assembly 136 on marine platform 110 is in fluid communication with first end 132' of fluid transfer hose 132. A second valve 539 forming part of a liquid manifold assembly 206 on liquid cargo marine vessel 500 is in fluid communication with first end 138' of fluid transfer hose 138. A first coupler 540 is attached to the first valve 538 and disposed to fluidically communicate with first valve 538 and second valve 539 when first and second valves 538, 539 are open. In one or more embodiments, the first coupler 540 is a quick release mechanism. Valves 538, 539 may be cryogenic valves and first coupler 540 may be a cryogenic coupler disposed to convey cryogenic fluids.

Quick release manifold system 536 is particularly desirable as an emergency release for fluid cargo transfer systems where toxic or harmful fluid or gas may be present, such as during transfer of liquified ammonia or other liquids, including but not limited to the cryogenic liquids described herein. Emergency release events may include but are not limited to weather events such as hurricanes, waves or wind, as well as operational events such as equipment failure, fire, leaks and the like. It will be appreciated that upon the occurrence of an emergency release event, or in anticipation of an imminent emergency release event, it may be necessary to quickly disengage connections between fluid cargo handling system 600 and another vessel, such as liquid cargo marine vessel 500. In prior art systems, as valves are closed and hoses are disengaged from one another, a small amount of fluid cargo, such as ammonia or LNG, may remain in the cavity of the standard quick release mechanism and may be spilled during release of the quick release mechanism, i.e., the few liters trapped between two valves, specifically the fluid that may be present in the quick release mechanism between valves.

The quick release manifold system 536 of the disclosure utilizes an inert fluid to purge the quick release manifold system 536 before release activation. As illustrated, generally a first fluid transfer hose 132 is in fluid communication with a second fluid transfer hose 138 via the quick release manifold system 536. Quick release manifold system 536 includes a first valve 538 in fluid communication with first end 132' of the fluid transfer hose 132 to control fluid flow within the fluid transfer hose 132. Likewise, quick release manifold system 536 includes a second valve 539 in fluid communication with first end 138' of the fluid transfer hose 138 to control fluid flow within the fluid transfer hose 138.

In one or more embodiments, the cryogenic coupler 133 described above may be first coupler 540 as described in relation to quick release manifold system 536. However, first coupler 540 need not be a cryogenic coupler, i.e., a coupler disposed for use with cryogenic liquids, but may be used for other liquids or gases as well. In any event, a pressurized fluid source 550 is in fluid communication with the first coupler 540 via an inlet port 551. In one or more embodiments, pressurized fluid source 550 functions as a source of pressurized inert gas, while in other embodiments, pressurized fluid source 550 may supply another type of pressurized fluid. Likewise, a drain tank 544 is in fluid communication with the first coupler 540 via a waste fluid outlet 552. The quick release manifold system 536 utilizes a pressurized inert gas, including but not limited to nitrogen, from the pressurized fluid source 550 to quickly purge first coupler 540 of ammonia, other toxic or harmful liquid or gas, or any other fluid cargo that may be present after the valves 538, 539 have been closed but before release of the coupler 540.

Figure 14:
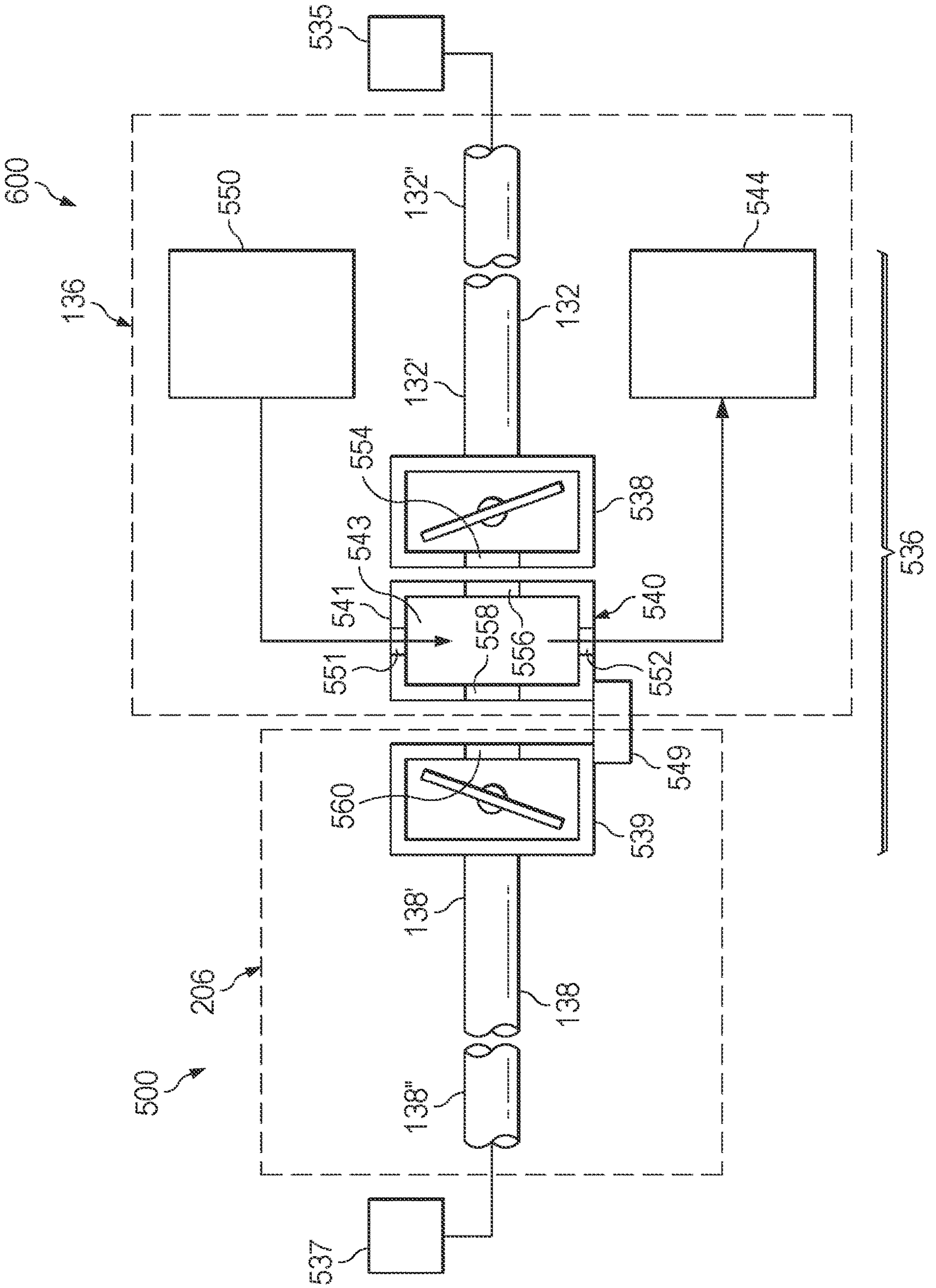
FIG. 14 is a schematic representation of one embodiment of a quick release manifold system of the disclosure.
Figure 15:
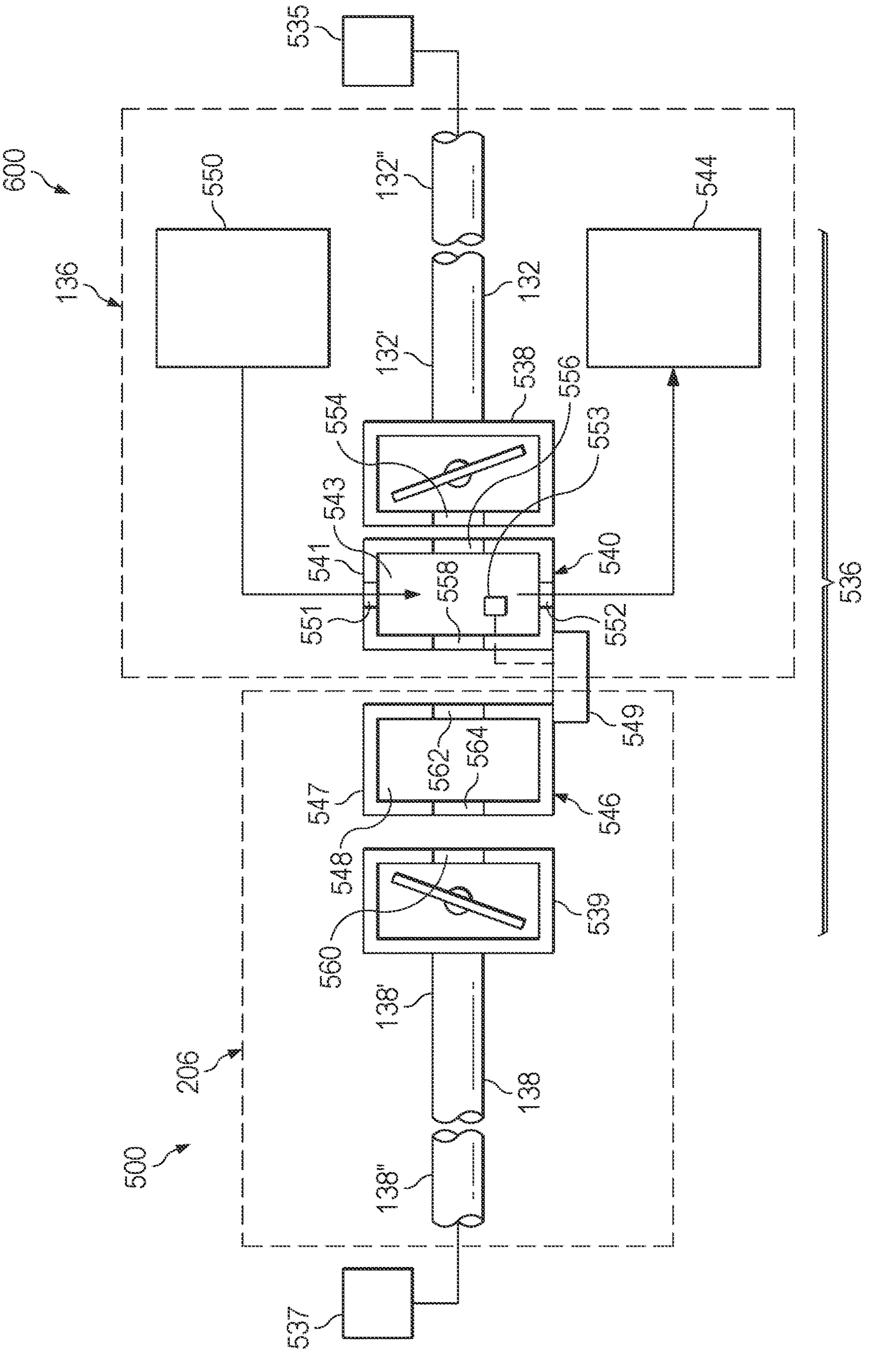
FIG. 15 is a schematic representation of another embodiment of a quick release manifold system of the disclosure.

FIGS. 14 and 15 schematically illustrate various embodiments of quick release manifold system 536 interconnecting a first fluid storage vessel 535 with a second fluid storage vessel 537. First fluid storage vessel 535 and second fluid storage vessel 537 are not limited to any particular structure, but can include tanks, pipelines and the like. For example, first fluid storage vessel 535 may be liquid cargo transport tank 204 and second fluid storage vessel 537 can be liquid cargo storage tank 304. In other embodiments, first fluid storage vessel 535 may be liquid cargo transport tank 204 and second fluid storage vessel 537 may be a conduit or pipeline, such as seabed conveyance system 440 and in particular, tubular 443. In one or more embodiments, one or both of first fluid storage vessel 535 and second fluid storage vessel 537 are cryogenic liquid storage vessels disposed to contain a cryogenic liquid as described above. In any event, first valve 538 includes a valve port 554 and second valve 539 includes a valve port 560. A first coupler 540 is formed of a coupler body 541 defining an internal cavity 543 having a first coupler port 556 and a second coupler port 558. First coupler 540 is attached to each of the first valve 538 and the second valve 539 to couple the valves 538, 539 together. In particular, first coupler port 556 is in fluid communication with valve port 554 of first valve 538, and second coupler port 558 is in fluid communication with the valve port 560 of the second valve 539. Coupler body 541 also includes a purging fluid inlet 551 and waste fluid outlet 552.

Purging fluid inlet 551 is fluidically coupled to the pressurized fluid source 550, and waste fluid outlet 552 is fluidically coupled to the drain tank 544. In one or more embodiments, the waste fluid outlet 552 is positioned in a lower portion of coupler body 541 to facilitate drainage of first coupler 540. In some embodiments, purging fluid inlet 551 may be positioned above waste fluid outlet 552 in coupler body 541. In this regard, the waste fluid outlet 552 may be spaced apart from the purging fluid inlet 551. When first and second valves 538, 539 are closed, coupler 540 is sealed for purging. Specifically, when first valve 538 and second valve 539 are closed, pressurized fluid source 550 is disposed to inject a pressurized fluid, such as an inert gas, into internal cavity 543 to purge internal cavity 543 of any residual liquid cargo therein, driving any such residual liquid cargo into drain tank 544 as waste fluid that includes the purging fluid and any other liquid or gas remaining in internal cavity 543 after the first and second valves 538, 539 are closed. In one or more embodiments, the inert gas is nitrogen.

Although first coupler 540 and first valve 538 are described herein as separate structures, the first coupler 540 and first valve 538 may be integrally formed with one another so long as an internal cavity 543 of the integral structure is in fluid communication with each of the pressurized fluid source 550 and drain tank 544 when the first valve 538 is closed, thereby isolating internal cavity 543. More specifically, internal cavity 543 is defined downstream of first valve 538 between first valve 538 and second port 558.

The fluid cargo handling system may also include an engagement mechanism 549 to secure first coupler 540 to an adjacent fitting, such as second valve 539 as shown in FIG. 14 or another coupler 546 as shown in FIG. 15. In any event, during a quick release operation, the quick release manifold system 536 may be remotely activated to purge internal cavity 543 before activating engagement mechanism 549 to release second valve 539 from engagement with first coupler 540 as shown in FIG. 14 or to release first coupler 540 from engagement with second coupler 546.

As shown in FIG. 15, in some embodiments, a second coupler 546 is attached to the first coupler between first coupler 540 and second valve 539. Similar to first coupler 540, second coupler 546 is formed of a coupler body 547 defining an internal cavity 548 and having ports 562 and 564 for flow of a fluid therethrough. In such case, when first coupler 540 is engaged with second coupler 546, internal cavity 548 of second coupler 546 is open to internal cavity 543 of first coupler 540. As such, an inert fluid introduced into first coupler 540 from pressurized fluid source 550 will also purge any residual liquid cargo from second coupler 546.

In one or more embodiments, engagement mechanism 549 may be hydraulically actuated to release an adjacent fitting (such as second valve 539 or second coupler 546) from first coupler 540. In some embodiments, engagement mechanism 549 may be in pressure communication with internal cavity 543 so that once a threshold pressure is achieved within internal cavity 543 to ensure any residual liquid cargo is purged therefrom, the threshold pressure will actuate engagement mechanism 549 automatically to release an adjacent fitting. In other embodiments, a sensor 553 disposed to measure a condition of internal cavity 543 may be used to actuate engagement mechanism 549. For example, in some embodiments, sensor 553 may be a pressure sensor disposed to measure the internal pressure within internal cavity 543. In this regard, the internal pressure within internal cavity 543 resulting from the inert gas charged within internal cavity 543 may be utilized to rapidly push fluid transfer hose 138 and second valve 539 away from liquid manifold assembly 136 during a quick release procedure.

In some embodiments, one or both of drain tank 544 and pressurized fluid source 550 are carried on the marine platform 110, while in other embodiments, pressurized fluid source 550 may be a pressurized tank or cavity integrally formed as part of first coupler 540.

While the quick release manifold system has been described in relation to marine platforms, it will be appreciated that the quick release manifold system may also be utilized for any manifold system, including dockside manifold systems and other land-based manifold systems for transfer of fluids, whether liquid or gas.

In an operation for transferring fluid cargo between two marine platforms, such as a marine platform 110 and a liquid cargo marine vessel 500, a first coupler 540 is used to fluidically couple a first valve 538 to a second valve 539. The first valve 538 and second valve 539 may be opened, actuated or operated to allow liquid cargo, such as a cryogenic fluid, to flow between the marine platform 110 and the liquid cargo marine vessel 500. In this regard, the liquid cargo may be pumped between the marine platform 110 and the liquid cargo marine vessel 500. Upon identification of an event, such as an emergency release event, that would require a quick cessation of flow and release of the coupling so as to permit liquid cargo marine vessel 500 to quickly be moved away from marine platform 110, the first and second valves 538, 539 are closed to isolate the first coupler 540, and a pressurized flushing fluid, such as an inert pressurized gas, is injected into first coupler 540. The pressurized fluid is used to flush the internal cavity 543 of first coupler 540 of any residual liquid cargo that may remain in first coupler 540 after first and second valves 538 were closed. In particular, the pressurized fluid is utilized to drive any such residual liquid cargo that may be present in internal cavity 543 into a drain tank 544. Thereafter, an engagement mechanism 549 may be actuated to separate second valve 539 from first coupler 540 and first valve 538. In some embodiments, the inert pressurized gas is nitrogen. In some embodiments, the cryogenic fluid is green ammonia, and as such, it will be appreciated that it is desirable to ensure that no residual ammonia is present when second valve 539 is released. In other embodiments, the cryogenic fluid is selected from one of liquified natural gas, liquified petroleum gas, green ammonia, liquified carbon dioxide, and liquified hydrogen.

Thus, a fluid cargo handling system has been described. In one or more embodiments, the fluid cargo handling system includes a marine platform having a buoyant hull with an upper deck and a hull bottom, the marine platform having a first side and a second side spaced apart from the first side; at least one hose reel carried by the marine platform; a first fluid transfer hose carried on the hose reel; a liquid manifold assembly carried by the platform and in fluid communication with the first fluid transfer hose; and a drive system comprising a first drive device carried by the marine platform and a second drive device carried by the marine platform; a first driveline engaged by the first drive device and extending from the hull bottom adjacent the first side towards the second side; and a second driveline engaged by the second drive device and extending from the hull bottom adjacent the second side towards the first side. In one or more embodiments, the fluid cargo handling system includes a marine platform having a buoyant hull with an upper deck and a hull bottom, the marine platform having an elongated first side and an elongated second side spaced apart from and opposing the elongated first side, a first end and a second end; a liquid manifold assembly carried by the platform; a first fluid transfer hose in fluid communication with the liquid manifold assembly, the first fluid transfer hose extending from the marine platform adjacent the second side; a second fluid transfer hose adjacent the first side of the marine platform and in fluid communication with the liquid manifold assembly; and a drive system comprising a first drive device carried by the marine platform adjacent the elongated first side and a second drive device carried by the marine platform adjacent the elongated second side, a third drive device carried by the marine platform adjacent the elongated first side and spaced apart from the first drive device, a fourth drive device carried by the marine platform adjacent the elongated second side and spaced apart from the second drive device, a first driveline engaged by the first drive device and extending from the hull bottom adjacent the first side towards the second side, a second driveline engaged by the second drive device and extending from the hull bottom adjacent the second side towards the first side, a third driveline engaged by the third drive device and extending from the hull bottom adjacent the first side towards the second side; and a fourth driveline engaged by the fourth drive device and extending from the hull bottom adjacent the second side towards the first side. In one or more embodiments, the fluid cargo handling system includes a marine platform having a buoyant hull with an upper deck and a hull bottom, the marine platform having an elongated first side and an elongated second side spaced apart from and opposing the elongated first side, a first end and a second end with a centerline plane generally parallel between the first side and second side and passing through the first end and second end to bisects buoyant hull; at least one hose reel carried by the marine platform adjacent the second side; a first fluid transfer hose carried on the hose reel; a liquid manifold assembly carried by the platform adjacent the first side and in fluid communication with the first fluid transfer hose; and a drive system comprising a first drive device carried by the marine platform adjacent the first side and a second drive device carried by the marine platform adjacent the second side; a first driveline engaged by the first drive device and extending from adjacent the first side away from the first side and through the centerline plane, and a second driveline engaged by the second drive device and extending from adjacent the second side away from the second side and through the centerline plane. In one or more embodiments, the fluid cargo handling system includes a marine platform having a buoyant hull with an upper deck and a hull bottom, the marine platform having an elongated first side and an elongated second side spaced apart from and opposing the elongated first side, a first end and a second end with a centerline plane generally parallel between the first side and second side and passing through the first end and second end to bisects buoyant hull; a lifting and handling crane mounted adjacent the upper deck; at least two hose reels carried by the marine platform adjacent the second side; a first fluid transfer hose carried on each hose reel; a liquid manifold assembly carried by the platform adjacent the first side and in fluid communication with each first fluid transfer hose; at least one second fluid transfer hose adjacent the first side of the marine platform and in fluid communication with the liquid manifold assembly; a standoff system comprising a drive system and a proximity sensor, wherein the proximity sensor is disposed adjacent the first side of the marine platform; and a drive system comprising a first drive device carried by the marine platform, a second drive device carried by the marine platform, a third drive device carried by the marine platform, a fourth drive device carried by the marine platform, a first driveline engaged by the first drive device and extending from adjacent the first side away from the first side and through the centerline plane, a second driveline engaged by the second drive device and extending from adjacent the second side away from the second side and through the centerline plane, a third driveline engaged by the third drive device and extending from adjacent the first side away from the first side and through the centerline plane, wherein the first driveline is spaced apart from the third driveline along the first side, a fourth driveline engaged by the fourth drive device and extending from adjacent the second side away from the second side and through the centerline plane, wherein the second driveline is spaced apart from the fourth driveline along the second side.

In one or more embodiments, the fluid cargo handling system includes a marine platform having a buoyant hull with an upper deck and a hull bottom, the marine platform having a first side and a second side; at least two hose reels carried by the marine platform and mounted on the upper deck adjacent the second side; a first cryogenic hose carried on each hose reel, each cryogenic hose having a first end and a second end; a liquid manifold assembly carried by the platform adjacent the first side and in fluid communication with the first end of each first cryogenic hose; and a marine manifold tower system comprising an elongated tower having a first end and a second end; wherein the first end comprises a seabed engagement mechanism and the second end comprises a liquid manifold assembly, wherein the second end of each cryogenic hose is coupled to the cryogenic hose manifold. In one or more embodiments, the fluid cargo handling system includes a marine platform having a buoyant hull with an upper deck and a hull bottom, the marine platform having a first side and a second side; a lifting and handling crane mounted adjacent the upper deck; at least two first cryogenic hoses carried on marine platform, each cryogenic hose having a first end and a second end; a liquid manifold assembly carried by the platform adjacent the first side and in fluid communication with the first end of each first cryogenic hose; and a marine manifold tower system comprising an elongated tower having a first end and a second end; wherein the first end comprises a seabed engagement mechanism and the second end comprises a cryogenic hose manifold assembly, wherein the second end of each cryogenic hose is coupled to the cryogenic hose manifold assembly.

In one or more embodiments, the fluid cargo handling system includes a first marine platform; a first fluid transfer hose carried on the first marine platform, the first fluid transfer hose having a first end and a second end; and a quick release manifold system carried on the first marine platform and in fluid communication with the first end of the first fluid transfer hose, wherein the quick release manifold system comprises a first valve in fluid communication with first end of the first fluid transfer hose to control fluid flow within the first fluid transfer hose; a first coupler attached to the first valve; a drain tank carried on the first marine platform and in fluid communication with the first coupler; and a pressurized fluid source carried on the first marine platform and in fluid communication with the first coupler. In one or more embodiments, the fluid cargo handling system includes a first marine platform; a first fluid transfer hose carried on the first marine platform, the first fluid transfer hose having a first end and a second end; and a quick release manifold system carried on the first marine platform and in fluid communication with the first end of the first fluid transfer hose, wherein the quick release manifold system comprises a first valve in fluid communication with first end of the first fluid transfer hose to control fluid flow within the first fluid transfer hose; a first coupler attached to the first valve; a drain tank carried on the first marine platform and in fluid communication with the first coupler; and a pressurized fluid source carried on the first marine platform and in fluid communication with the first coupler. In one or more embodiments, the fluid cargo handling system includes a first marine platform; a first fluid transfer hose carried on the first marine platform, the first fluid transfer hose having a first end and a second end; a second marine platform; a second fluid transfer hose carried on the second marine platform, the second fluid transfer hose having a first end and a second end; a quick release manifold system carried on the first marine platform and in fluid communication with the first end of the first fluid transfer hose, wherein the quick release manifold system comprises a first valve in fluid communication with first end of the first fluid transfer hose to control fluid flow within the first fluid transfer hose; a first coupler attached to the first valve; a drain tank carried on the first marine platform and in fluid communication with the first coupler; and a pressurized fluid source carried on the first marine platform and in fluid communication with the first coupler; and a second valve in fluid communication with first end of the second fluid transfer hose to control fluid flow within the second fluid transfer hose, wherein the second marine platform is adjacent the first marine platform; and wherein the second valve is in fluid communication with the first coupler. In one or more embodiments, the fluid cargo handling system includes a first marine platform; a first fluid transfer hose carried on the first marine platform, the first fluid transfer hose having a first end and a second end; a second marine platform; a second fluid transfer hose carried on the second marine platform, the second fluid transfer hose having a first end and a second end; a quick release manifold system carried on the first marine platform and in fluid communication with the first end of the first cryogenic liquid hose, wherein the quick release manifold system comprises a first valve in fluid communication with first end of the first cryogenic liquid hose to control fluid flow within the first cryogenic liquid hose; a first coupler attached to the first cryogenic valve; a drain tank carried on the first marine platform and in fluid communication with the first coupler; and a pressurized fluid source carried on the first marine platform and in fluid communication with the first coupler; and a second valve in fluid communication with first end of the second fluid transfer hose to control fluid flow within the second cryogenic liquid hose, wherein the second marine platform is adjacent the first marine platform; and wherein the second valve is in fluid communication with the first coupler. In one or more embodiments, a fluid handling system includes a first fluid transfer hose, the first fluid transfer hose having a first end and a second end; a second fluid transfer hose, the second fluid transfer hose having a first end and a second end; a first valve in fluid communication with first end of the first fluid transfer hose to control fluid flow within the first fluid transfer hose; a second valve in fluid communication with first end of the second fluid transfer hose to control fluid flow within the second fluid transfer hose; a first coupler attached to the first valve and the second valve, the first coupler having a first port in fluid communication with the first valve, a second port in fluid communication with the second valve, a purging fluid inlet and a waste fluid outlet; a pressurized fluid source in fluid communication with the purging fluid inlet of the first coupler; and a drain tank in fluid communication with the waste fluid outlet of the first coupler. In one or more embodiments, a fluid handling system includes a first valve having a valve port; a second valve having a valve port; a coupler attached to the first valve and the second valve, the coupler having a first port in fluid communication with the valve port of the first valve, a second port in fluid communication with the valve port of the second valve, a purging fluid inlet and a waste fluid outlet; a pressurized fluid source in fluid communication with the purging fluid inlet of the coupler; and a drain tank in fluid communication with the waste fluid outlet of the coupler.

Any of the foregoing fluid cargo handling system may further include, alone or in combination, any of the following:

The liquid manifold assembly is adjacent the first side and the hose reel is adjacent the second side.

A first hull driveline guide attached to the hull bottom adjacent the first side, wherein the first hull driveline guide is a roller engaged by the first driveline, and a second hull driveline guide attached to the hull bottom adjacent the second side, wherein second hull driveline guide is a roller engaged by the second driveline.

Each drive device comprises a winch.

The marine platform further comprises a second deck spaced apart from the upper deck and positioned between the upper deck and the hull bottom, wherein the first and second drive devices are positioned on the second deck.

The buoyant hull has an interior between the upper deck and the hull bottom, wherein the first and second drive devices are positioned within the interior of buoyant hull.

The first driveline extends down adjacent the first side from the first drive device to the hull bottom and the second driveline extends down adjacent the second side from the second drive device to the hull bottom.

The buoyant hull comprises one or more columns extending between the upper deck and the hull bottom, wherein each column comprises a base attached to the hull bottom and with a drive device is mounted in the column, wherein the driveline engaged by the drive device extends down through the column and extends from the base of the column through the hull bottom.

Each driveline is a chain having a first end and a second end, the first end of each chain being engaged by a drive device and the second end of each chain coupled to a driveline anchor system, the driveline anchor system comprising an anchor and an elastic line interconnecting the second end of the chain to the anchor.

The elastic line is buoyant.

The first fluid transfer hose is a floating hose.

A proximity sensor disposed along the first side.

The liquid manifold assembly is adjacent the first side and further comprising a hose reel is adjacent the second side, wherein the first fluid transfer hose is disposed on the hose reel.

A first hull driveline guide attached to the hull bottom adjacent the first side, a second hull driveline guide attached to the hull bottom adjacent the second side, wherein second hull driveline guide is a roller engaged by the second driveline, a third hull driveline guide attached to the hull bottom adjacent the first side and spaced apart from the first hull driveline guide, and a fourth hull driveline guide attached to the hull bottom adjacent the second side and spaced apart from the second hull driveline guide, wherein the first hull driveline guide engages the first driveline, the second hull driveline guide engages the second driveline, the third hull driveline guide engages the third driveline, and the fourth hull driveline guide engages the fourth driveline.

Each drive device comprises a winch.

The marine platform further comprises a second deck spaced apart from the upper deck and positioned between the upper deck and the hull bottom, wherein each of the drive devices is positioned on the second deck.

The buoyant hull has an interior between the upper deck and the hull bottom, wherein each of the drive devices is positioned on the second deck.

The first and third drivelines extend down adjacent the first side from their respective drive devices to the hull bottom and the second and fourth drivelines extend down adjacent the second side from their respective drive devices to the hull bottom.

The buoyant hull comprises one or more columns extending between the upper deck and the hull bottom, wherein each column comprises a base attached to the hull bottom and with a separate one of the drive devices mounted in the column, wherein the driveline engaged by the separate one of the drive devices extends down through the column and extends from the base of the column through the hull bottom.

A second fluid transfer hose, wherein the first fluid transfer hose extends from the marine platform adjacent the second side; and the second fluid transfer hose extends from the marine platform adjacent the first side.

A first proximity sensor adjacent the first side.

A second proximity sensor adjacent the second side.

The drive system further comprises a third drive device carried by the marine platform adjacent the first side and a fourth drive device carried by the marine platform adjacent the second side; a third driveline engaged by the third drive device and extending from adjacent the first side away from the first side and through the centerline plane, and a fourth driveline engaged by the fourth drive device and extending from adjacent the second side away from the second side and through the centerline plane.

A floating storage unit having a liquid manifold assembly, wherein a first end of the first fluid transfer hose carried on the hose reel is in fluid communication with the liquid manifold assembly carried by the platform and a second end of the of the first fluid transfer hose is coupled to and in fluid communication with the liquid manifold assembly carried by the floating storage unit.

A fluid cargo transport vessel moored apart from the floating storage unit, the fluid cargo transport vessel having a liquid manifold assembly, wherein a first end of the second fluid transfer hose is coupled to and in fluid communication with the liquid manifold assembly carried by the platform and a second end of the of the second fluid transfer hose is coupled to and in fluid communication with the liquid manifold assembly carried by the fluid cargo transport vessel, wherein the marine platform is positioned adjacent the fluid cargo transport vessel to allow the second fluid transfer hose to be coupled to the liquid manifold assembly carried by the fluid cargo transport vessel but spaced apart from the fluid cargo transport vessel.

The liquid manifold assembly comprises a first valve in fluid communication with a first end of the first hose to control fluid flow within the first hose; a first coupler attached to the first valve; a drain tank carried on the marine platform and in fluid communication with the first coupler; a pressurized fluid source carried on the marine platform and in fluid communication with the first coupler; and a drain tank in fluid communication with the first coupler.

A marine manifold tower system having an elongated tower with a first end and a second end; wherein a seabed engagement mechanism is secured to the first end of the elongated tower and a liquid manifold assembly having a cryogenic coupler is supported at the second end of the elongated tower, the cryogenic coupler attached to and in fluid communication with the first fluid transfer hose.

The drive device is disposed within a positive pressure enclosure.

The marine platform further comprises a second deck spaced apart from the upper deck and positioned between the upper deck and the hull bottom, wherein the first and second drive devices are positioned on the second deck.

The fluid cargo handling system of any claim, further comprising a marine vessel;

a second fluid transfer hose carried on the marine vessel, the second fluid transfer hose having a first end and a second end; and a second valve in fluid communication with first end of the second hose to control fluid flow within the second fluid transfer hose, wherein the marine vessel is adjacent the marine platform; and wherein the second valve is in coupled to the first coupler.

The buoyant hull has an interior between the upper deck and the hull bottom, wherein the first and second drive devices are positioned within the interior of buoyant hull.

The first driveline extends from the hull bottom adjacent the first side and passes under the second side.

The first driveline extends from the hull bottom adjacent the first side and extends toward the second side; and wherein the second driveline extends from the hull bottom adjacent the second side and extends toward the first side.

The first driveline extends down adjacent the first side from the first drive device to the hull bottom and second driveline extends down adjacent the second side from the second drive device to the hull bottom.

The driveline comprises a chain.

The buoyant hull comprises one or more columns.

The buoyant hull is a barge.

The elastic line is buoyant.

The driveline is a non-buoyant cable.

A driveline anchor system attached to the driveline, the driveline anchor system comprises an anchor, a buoy, a first elastic line interconnecting the anchor to the buoy and a second elastic line interconnecting the second end of chain to buoy.

The hose reel is adjacent the second side of the platform and the manifold is adjacent the first side of the platform.

The first hose is a floating hose.

The second hose is engaged by the crane.

The second hose is supported by the crane above the upper deck.

A control system comprising the first and second drive devices and a proximity sensor.

The control system is disposed to actuate the first and second drive devices based on a signal from the proximity sensor.

The crane is movable from a first position where the second hose is supported above the upper deck to a second position where the first hose extends past the first side.

At least two hose reels carried by the marine platform, each hose reel having a first hose carried thereon.

At least two first drive devices disposed adjacent the first side, the at least two first drive devices spaced apart from one another along the first side; and at least two second drive devices spaced apart from the first side, the at least two second drive devices further spaced apart from one another.

At least two first drive devices disposed adjacent the first side, the at least two first drive devices spaced apart from one another along the first side; and at least two second drive devices spaced apart from the first side;

wherein one second drive device is adjacent the first end and one second drive device is adjacent the second end of the platform.

Each drive device engages two drivelines.

Two drivelines engaged by each drive device and extending from adjacent the hull bottom towards the opposite side of the marine platform adjacent which the drive device is mounted.

A driveline guide for each driveline, each driveline guide mounted adjacent the hull bottom and engaging a driveline.

A driveline guide for each driveline, each driveline guide mounted against the hull bottom and engaging a driveline.

A driveline guide mounted on the hull bottom directly below each drive device, wherein the driveline extends substantially vertically from the drive device to the driveline guide.

A separate driveline guide for each driveline, wherein each driveline guide is mounted on the hull bottom below a drive device and disposed to direct a driveline towards the opposite side of the marine platform from the drive device under which the driveline guide is mounted.

The driveline guide is a roller.

The roller comprises a swivel.

The roller comprises a cogged wheel disposed to engage a chain.

The driveline guide comprises a tube through which the driveline extends.

The cryogenic hose manifold assembly comprises two or more cryogenic hose connectors.

A drive system having a first drive device carried by the marine platform and a second drive device carried by the marine platform; a first driveline engaged by the first drive device and extending from the hull bottom; and a second driveline engaged by the second drive device and extending from the hull bottom.

The elongated tower further comprises an access system extending from the second end of the elongated tower along only a portion of the length of the elongated tower to an access platform disposed between the first end and the second end.

A connection platform disposed at the second end of the elongated tower and on which is mounted the cryogenic hose manifold assembly.

The access system comprises a ladder or stairs.

A hose handling device mounted on marine manifold tower system.

Each cryogenic hose is a floating hose.

The elongated tower comprises an elongated, hollow tubular having an interior passage.

The elongated tower comprises a mono pole or single mast tower.

The elongated tower comprises lattice tower or self-supporting tower.

A seabed conveyance system extending from the tower adjacent the first end, the seabed tubular system in fluid communication with the cryogenic hose manifold assembly.

The seabed conveyance system extends from the first end of the tower up through the interior of the elongated tower to the cryogenic hose manifold assembly.

The seabed engagement mechanism comprises a support structure extending around at least a portion of the first end of the tower, with at least two sleeves spaced apart from one another on the support structure; and a piling extending through each sleeve.

A first marine platform; a first fluid transfer hose carried on the first marine platform, the first fluid transfer hose having a first end and a second end; and a quick release manifold system carried on the first marine platform and in fluid communication with the first end of the first fluid transfer hose, wherein the quick release manifold system comprises a first valve in fluid communication with first end of the first fluid transfer hose to control fluid flow within the first fluid transfer hose; a first coupler attached to the first valve; a drain tank carried on the first marine platform and in fluid communication with the first coupler; and a pressurized fluid source carried on the first marine platform and in fluid communication with the first coupler.

The pressurized fluid source is a pressurized nitrogen gas source.

The pressurized fluid source is a pressurized inert gas source.

The first fluid transfer hose is a hose.

The first fluid transfer hose is a cryogenic hose and the first valve is a cryogenic valve.

The second fluid transfer hose is a hose.

The second fluid transfer hose is a cryogenic hose and the second valve is a cryogenic valve.

A second hose having a first end and a second end; and a second valve in fluid communication with first end of the second hose to control fluid flow of the second hose, wherein the second valve is in fluid communication with the first coupler.

The first coupler comprises a coupler body with an internal cavity defined within the coupler body.

The drain tank is in fluid communication with the internal cavity of the first coupler; and the pressurized fluid source is in fluid communication with the internal cavity of the first coupler.

A second coupler attached to the second valve, wherein the second coupler is releasably engaged with the first coupler.

The second coupler comprises a coupler body with an internal cavity defined within the coupler body.

The internal cavities of the first and second couplers are in fluid communication with one another when the first and second couplers are releasable engaged with one another.

The first fluid transfer hose is a hose carried on a hose reel mounted on the first marine platform.

The marine platform comprises a ship.

The marine platform comprises a buoyant hull.

The marine platform comprises a barge.

Each marine platform is one of a jack-up platform, a semi-submersible platform, a barge, a buoyant vessel, a ship, a fixed platform, a spar platform, or a tension-leg platform.

The marine platform is a floating platform.

The coupler has a fluid inlet fluidically coupled to the inert gas source and a fluid outlet fluidically coupled to the drain tank.

The coupler includes an engagement mechanism to secure coupler to an adjacent fitting.

The first coupler is hydraulically actuated.

The first coupler can be hydraulically actuated to engage and disengage the first coupler from an adjacent fitting.

The drain tank and the nitrogen source are carried on the platform.

A hose saddle carried on platform and first end of the second hose.

A hose saddle supporting each end of the second hose.

Three second hoses, the three second hoses comprising two liquified gas hoses and one vapor return hose.

In addition, a method of transferring fluid cargo between two marine platforms has been described. One embodiment of the fluid cargo transfer method includes utilizing a quick release mechanism to couple a first valve of a first marine platform to a second valve of a second marine platform; operating the first and second valves to initiate flow of a cargo fluid between the first and second marine platforms; closing the first and second valves to isolate the quick release mechanism; injecting a pressurized flushing fluid into the quick release mechanism; and utilizing the injected pressurized fluid to flush the quick release mechanism of cargo fluid remaining in the quick release mechanism after the first and second valves are closed. One embodiment of the fluid cargo transfer method includes utilizing a quick release mechanism to couple a first valve of a first marine platform to a second valve of a second marine platform; operating the first and second valves to initiate flow of a cargo fluid between the first and second marine platforms; closing the first and second valves to isolate the quick release mechanism; injecting a pressurized flushing fluid into the quick release mechanism; flushing the quick release mechanism of cargo fluid remaining in the quick release mechanism after the first and second valves are closed; and utilizing the injected pressurized fluid to drive the flushed cargo fluid into a drainage tank. In other embodiments, a fluid transfer method includes utilizing a quick release mechanism to couple a first valve to a second valve; operating the first and second valves to initiate flow of a fluid between the first and second valves; closing the first and second valves to isolate the quick release mechanism; injecting a pressurized flushing fluid into the quick release mechanism; and utilizing the injected pressurized fluid to flush the quick release mechanism of fluid remaining in the quick release mechanism after the first and second valves are closed. One embodiment of a fluid transfer method includes utilizing a quick release mechanism to couple a first valve to a second valve; operating the first and second valves to initiate flow of a fluid between the first and second valves; closing the first and second valves to isolate the quick release mechanism; injecting a pressurized flushing fluid into the quick release mechanism; flushing the quick release mechanism of fluid remaining in the quick release mechanism after the first and second valves are closed; and utilizing the injected pressurized fluid to drive the flushed fluid into a drainage tank. One embodiment of a fluid transfer method includes utilizing a quick release mechanism to couple a first valve to a second valve; operating the first and second valves to initiate flow of a cryogenic liquid between the first and second valves; closing the first and second valves to isolate the quick release mechanism; injecting a pressurized flushing gas into the quick release mechanism; flushing the quick release mechanism of cryogenic liquid remaining in the quick release mechanism after the first and second valves are closed; and utilizing the injected pressurized flushing gas to drive the cryogenic liquid into a drainage tank.

Any of the foregoing embodiments of a method for transferring fluid cargo between two marine platforms may include alone or in combination, any of the following:

Actuating the quick release mechanism to decouple the second valve mechanism from the first valve mechanism.

Decoupling the second valve mechanism from the first valve mechanism comprises disengaging the second valve mechanism from the quick release coupler.

Injecting a pressurized flushing fluid comprises introducing an inert pressurized gas into the quick release mechanism.

Inert pressurized gas is nitrogen.

The cargo fluid is a cryogenic liquid.

The cryogenic liquid is green ammonia.

The cryogenic fluid is a liquified fuel.

The cryogenic fluid is selected from one of liquified natural gas, liquified petroleum gas, green ammonia, liquified carbon dioxide, and liquified hydrogen.

Pumping a cargo fluid between the first and second marine platforms.

Establishing a fluidic coupling between first and second marine platforms; pumping a cargo fluid between the first and second marine platforms; stopping the pumping of cargo fluid between the first and second marine platforms upon identification of an emergency release event; closing the first and second valves of the manifold system; injecting an inert fluid into the coupler positioned between the two valves; following injection of the inert fluid, activating the coupler to fluidically decouple the first and second marine platforms.

The steps of stopping the pumping of cargo fluid, closing the first and second valves, injecting an inert fluid and fluidic decoupling occur automatically upon identification of an emergency release event.

Utilizing the pressure from the pressurized fluid to decouple the quick release valve mechanism from one of the valves.

One marine platform is a floating storage unit and the other marine platform is a fluid cargo transport vessel.

One marine platform is a dock and the other marine platform is a fluid cargo transport vessel.

One marine platform is a fixed, offshore marine manifold tower system and the other marine platform is a fluid cargo transport vessel.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A fluid cargo handling system comprising: a first fluid transfer line having a first end and a second end; a first valve disposed at the first end of the first fluid transfer line, the first valve having a valve port; a second fluid transfer line having a first end and a second end; a second valve disposed at the first end of the second fluid transfer line, the second valve having a valve port; a coupler attached to the first valve and the second valve, the coupler having a first port in fluid communication with the valve port of the first valve, a second port in fluid communication with the valve port of the second valve, a purging fluid inlet and a waste fluid outlet; a pressurized fluid source in fluid communication with the purging fluid inlet of the coupler; and a drain tank in fluid communication with the waste fluid outlet of the coupler.

2. The fluid cargo handling system of claim 1, further comprising a first fluid storage vessel in fluid communication with the second end of the first fluid transfer line and a second fluid storage vessel in fluid communication with the second end of the second fluid transfer line valve.

3. The fluid cargo handling system of claim 2, further comprising a floating marine platform on which is mounted the coupler, the first valve, the pressurized fluid source, the drain tank and a hose reel carrying the first fluid transfer line; a fluid cargo transport vessel carrying the second fluid storage vessel, and a floating storage unit carrying the first fluid storage vessel, wherein the floating storage unit is spaced apart from the floating marine platform and adjacent the fluid cargo transport vessel.

4. The fluid cargo handling system of claim 3, wherein a least one of the fluid transfer lines comprises a hose.

5. The fluid cargo handling system of claim 1, wherein the pressurized fluid source comprises pressurized inert gas.

6. The fluid cargo handling system of claim 1, wherein the first valve is closed and the second valve is closed.

7. The fluid cargo handling system of claim 1, wherein the first fluid transfer line comprises a first hose in fluid communication with the first valve and the second fluid transfer line comprises a second hose in fluid communication with the second valve.

8. The fluid cargo handling system of claim 7, further comprising a first fluid storage vessel in fluid communication with the first valve via the first hose and a second fluid storage vessel in fluid communication with the second valve via the second hose.

9. The fluid cargo handling system of claim 8, wherein first fluid storage vessel is a cryogenic liquid storage tank and the second fluid storage vessel is a cryogenic liquid transport tank carried on a fluid cargo transport vessel.

10. The fluid cargo handling system of claim 7, further comprising an engagement mechanism securing the coupler to the second valve.

11. The fluid cargo handling system of claim 10, further comprising a pressure sensor disposed to measure the pressure within the coupler.

12. The fluid cargo handling system of claim 7, wherein the coupler and the first valve are integrally formed, with an internal cavity defined between the first valve and the second port of the coupler, wherein the purging fluid inlet and the waste fluid outlet are in fluid communication with the internal cavity.

13. A fluid cargo handling system comprising:

a first marine platform;

a first fluid transfer hose carried on the first marine platform, the first fluid transfer hose having a first end and a second end; and a manifold system carried on the first marine platform and in fluid communication with the first end of the first fluid transfer hose, wherein the manifold system comprises a first valve in fluid communication with first end of the first fluid transfer hose to control fluid flow within the first fluid transfer hose; a first coupler attached to the first valve downstream of the fluid transfer hose, wherein the first coupler has a first port in fluid communication with the first valve, a second port, a purging fluid inlet and a waste fluid outlet; a drain tank carried on the first marine platform and in fluid communication with the first coupler via the waste fluid outlet; and a pressurized fluid source carried on the first marine platform and in fluid communication with the first coupler via the purging fluid inlet.

14. The fluid cargo handling system of claim 13, further comprising a second marine platform; a second fluid transfer hose extending from the second marine platform, the second fluid transfer hose having a first end; a second valve disposed at the first end of the second fluid transfer hose, the second valve engaged with the first coupler and in fluid communication with the first coupler via the second port of the first coupler.

15. The fluid cargo handling system of claim 13, wherein the first valve and first coupler are integrally formed with an internal cavity defined between the first valve and the second port of the coupler, wherein the purging fluid inlet and the waste fluid outlet are in fluid communication with the internal cavity.

16. The fluid cargo handling system of claim 13, wherein the coupler defines an internal cavity between the first port and the second port, the fluid cargo handling system further comprising a second fluid transfer hose having a first end and a second end with a second valve at the first end of the second fluid transfer hose, an engagement mechanism securing the coupler to the second valve and a pressure sensor disposed to measure the pressure within the internal cavity to trigger actuation of the engagement mechanism.

17. The fluid cargo handling system of claim 14, wherein the second marine platform is a fluid cargo transport vessel, the fluid cargo handling system further comprising a first fluid storage vessel in fluid communication with the first valve and a second fluid storage vessel carried on the fluid cargo transport vessel and in fluid communication with the second valve via the second hose interconnecting the second valve to a liquid manifold assembly carried on the fluid cargo transport vessel.

18. The fluid cargo handling system of claim 13, wherein the pressurized fluid source comprises pressurized inert gas.

19. The fluid cargo handling system of claim 18, wherein the pressurized inert gas is nitrogen.

20. A method for fluid cargo transfer comprising utilizing a coupling mechanism to couple a first valve of a first marine platform adjacent to a second valve of a second marine platform; operating the first and second valves to initiate flow of a cargo fluid between the first and second marine platforms; stopping the pumping of cargo fluid between the first and second marine platforms upon identification of an emergency release event; thereafter, closing the first and second valves to isolate the coupling mechanism; injecting a pressurized flushing fluid into the coupling mechanism; flushing the release mechanism of cargo fluid remaining in the coupling mechanism after the first and second valves are closed; and utilizing the injected pressurized fluid to drive the flushed cargo fluid into a drainage tank.

21. The fluid cargo transfer method of claim 20, further comprising disengaging the coupling mechanism from the second valve after the coupling mechanism has been flushed.

22. The fluid cargo transfer method of claim 20, wherein injecting comprises introducing an inert pressurized gas into the coupling mechanism.

23. The fluid cargo transfer method of claim 20, wherein the cargo fluid is a cryogenic liquid.

24. The fluid cargo transfer method of claim 20, further comprising pumping a cargo fluid between the first and second marine platforms.

25. A method for fluid transfer comprising coupling a first valve adjacent to a second valve to define an internal cavity therebetween; operating the first and second valves to initiate flow of a cryogenic liquid through the internal cavity and between the first and second valves; pumping cryogenic liquid through the first and second valves; upon identification of an emergency release event, stopping the pumping of cryogenic liquid; thereafter closing the first and second valves to isolate the internal cavity; injecting a pressurized flushing gas into the internal cavity; flushing the internal cavity of cryogenic liquid remaining in the internal cavity after the first and second valves are closed; and utilizing the injected pressurized flushing gas to drive the cryogenic liquid into a drainage tank.

26. A method for fluid transfer comprising coupling a first valve adjacent to a second valve to define an internal cavity therebetween; operating the first and second valves to initiate flow of a cryogenic liquid through the internal cavity and between the first and second valves; closing the first and second valves to isolate the internal cavity; injecting a pressurized flushing gas into the internal cavity; flushing the internal cavity of cryogenic liquid remaining in the internal cavity after the first and second valves are closed; utilizing the injected pressurized flushing gas to drive the cryogenic liquid into a drainage tank; and disengaging the first valve from the second valve after the internal cavity has been flushed.

27. The fluid transfer method of claim 26, further comprising utilizing the pressurized flushing gas to disengage the first valve from the second valve.

* * * * *